US012182066B2

(12) United States Patent
Shendge et al.

(10) Patent No.: US 12,182,066 B2
(45) Date of Patent: Dec. 31, 2024

(54) NAMESPACE SALVAGE IN LOGGING-BASED FILESYSTEMS

(71) Applicant: Dell Products L.P., Round Rock, TX (US)

(72) Inventors: Geetha Shendge, San Jose, CA (US); Charles Hickey, Aptos, CA (US); Dhawal Bhagwat, Bangalore (IN); Ramesh Kannan K, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/322,518

(22) Filed: May 23, 2023

(65) Prior Publication Data

US 2024/0394219 A1 Nov. 28, 2024

(51) Int. Cl.
*G06F 16/11* (2019.01)
*G06F 11/14* (2006.01)
*G06F 16/13* (2019.01)
*G06F 16/18* (2019.01)

(52) U.S. Cl.
CPC ........ *G06F 16/122* (2019.01); *G06F 11/1458* (2013.01); *G06F 16/128* (2019.01); *G06F 16/13* (2019.01); *G06F 16/1805* (2019.01); *G06F 2201/84* (2013.01)

(58) Field of Classification Search
CPC .... G06F 16/122; G06F 16/13; G06F 16/1805; G06F 16/128; G06F 11/1458; G06F 2201/84
USPC .......................................................... 707/634
See application file for complete search history.

(56) References Cited

U.S. PATENT DOCUMENTS

| | | | | |
|---|---|---|---|---|
| 8,549,051 | B2 * | 10/2013 | Ahrens | G06F 16/128 707/829 |
| 8,612,382 | B1 * | 12/2013 | Patel | G06F 11/0793 707/639 |
| 2015/0067442 | A1 * | 3/2015 | Shiozawa | G06F 11/0787 714/764 |
| 2021/0271561 | A1 * | 9/2021 | Mathew | G06F 9/30047 |

OTHER PUBLICATIONS

Ohad Rodeh, Josef Bacik, and Chris Mason. 2013. BTRFS: The Linux B-Tree Filesystem. ACM Trans. Storage 9, 3, Article 9 (Aug. 2013), 32 pages. https://doi.org/10.1145/2501620.2501623 (Year: 2013).*
Arcege et al. "What is the purpose of the lost+found folder in Linux and Unix?". Published Jun. 21, 2014. Accessed Jun. 6, 2024 from <https://unix.stackexchange.com/questions/18154/what-is-the-purpose-of-the-lostfound-folder-in-linux-and-unix> (Year: 2014).*

* cited by examiner

*Primary Examiner* — Robert W Beausoliel, Jr.
*Assistant Examiner* — Lauren Zannah Ganger
(74) *Attorney, Agent, or Firm* — Staniford Tomita LLP

(57) ABSTRACT

Recovering a namespace held in a tree structure that has been corrupted includes scanning a linear representation of pages belonging to the tree structure to copy out keys from uncorrupted leaf pages into a new tree structure. The scan is repeated over snapshots that have been taken of the tree to find keys that are missing from the new tree structure. Upon finding a missing key in an uncorrupted leaf page of a snapshot, the missing key is copied out into the new tree structure unless the missing key has already been found and copied out from an uncorrupted leaf page of a more recent snapshot taken of the tree structure.

12 Claims, 16 Drawing Sheets

| 710A key → | 711 ↴ Type: 1 CHILD | ID <10:12> | 715 ↴ Hash 41006656 | 720 ↴ Size e4 | File inode, dirent and hashes for "/a" 725 ↴ Offset dc11 | 730 ↴ Checksum 62e51468 | payload → | type=6 pfid=1:10 cdid=12 hash=6d077de3 file_has_sum += 0x41006653 nlinks += 1 |
|---|---|---|---|---|---|---|---|---|
| 710B key → | Type: 5 DIRENT | ID <10:12> | Hash 41006653 | Size 15 | Offset dbfc | Checksum 41d2045e | payload → | dm_direc_t file_name="A" file_id=12 |
| 710C key → | Type: 6 CSHASH | ID <10:12> | Hash 41006653 | Size 0 | Offset 0 | Checksum e030123 | | |
| 710D key → | Type: 8 CNHASH | ID <10:12> | Hash 41006653 | Size 0 | Offset 0 | Checksum e130125 | | |

```
When a first key indexing an inode of a particular file has been found, but a second
key indexing a name of the particular file has not been found, generate a new name
for the particular file that includes an inode number of the particular file and a
placeholder name
1610
```

```
Assign the new name to the particular file
1615
```

```
When a first key indexing an inode of a particular file has not been found, but a
second key indexing a name of the particular file has been found, generate a new
name for the particular file that includes the name and an indication that the
particular file could not be recovered
1810
```

```
Assign the new name to the particular file
1815
```

NAMESPACE SALVAGE IN LOGGING-BASED FILESYSTEMS

TECHNICAL FIELD

The present invention relates generally to information processing systems, and more particularly to recovering a namespace.

BACKGROUND

A cyber-attack is an attempt by individuals or organizations to exploit vulnerabilities in computer systems, networks, or devices for malicious purposes. Once an intruder gains access to a computer system, the intruder may begin deleting information. Such deletions can cause significant damage to businesses, governments, and individuals.

Consider, as an example, an attack on a deduplicating filesystem. Filesystems provide a way to organize data stored in a storage system and present that data to clients and applications. A deduplicating filesystem is type of filesystem that seeks to reduce the amount of redundant data that is stored. Generally, data that is determined to already exist on the storage system is not again stored. Instead, metadata including references is generated to point to the already stored data and allow for reconstruction. Using a deduplicating filesystem can dramatically reduce storage costs. A large-scale deduplicating filesystem may hold many millions of files.

A filesystem, including a deduplicating filesystem, may store namespace metadata in a tree data structure such as a B+ Tree. Such namespace metadata may include pieces critical to the reassembly of files such as file names and pointers to file content in addition to attributes such as last modified timestamps, creation dates, and so forth. The loss or corruption of a relatively small amount of namespace metadata can have an exceptionally large impact with respect to the number of files rendered inaccessible.

There remains a continuing need for improved systems and techniques to recover namespace data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 7 shows an example of a leaf page with four keys per file, according to one or more embodiments.

DETAILED DESCRIPTION

Figure 1:
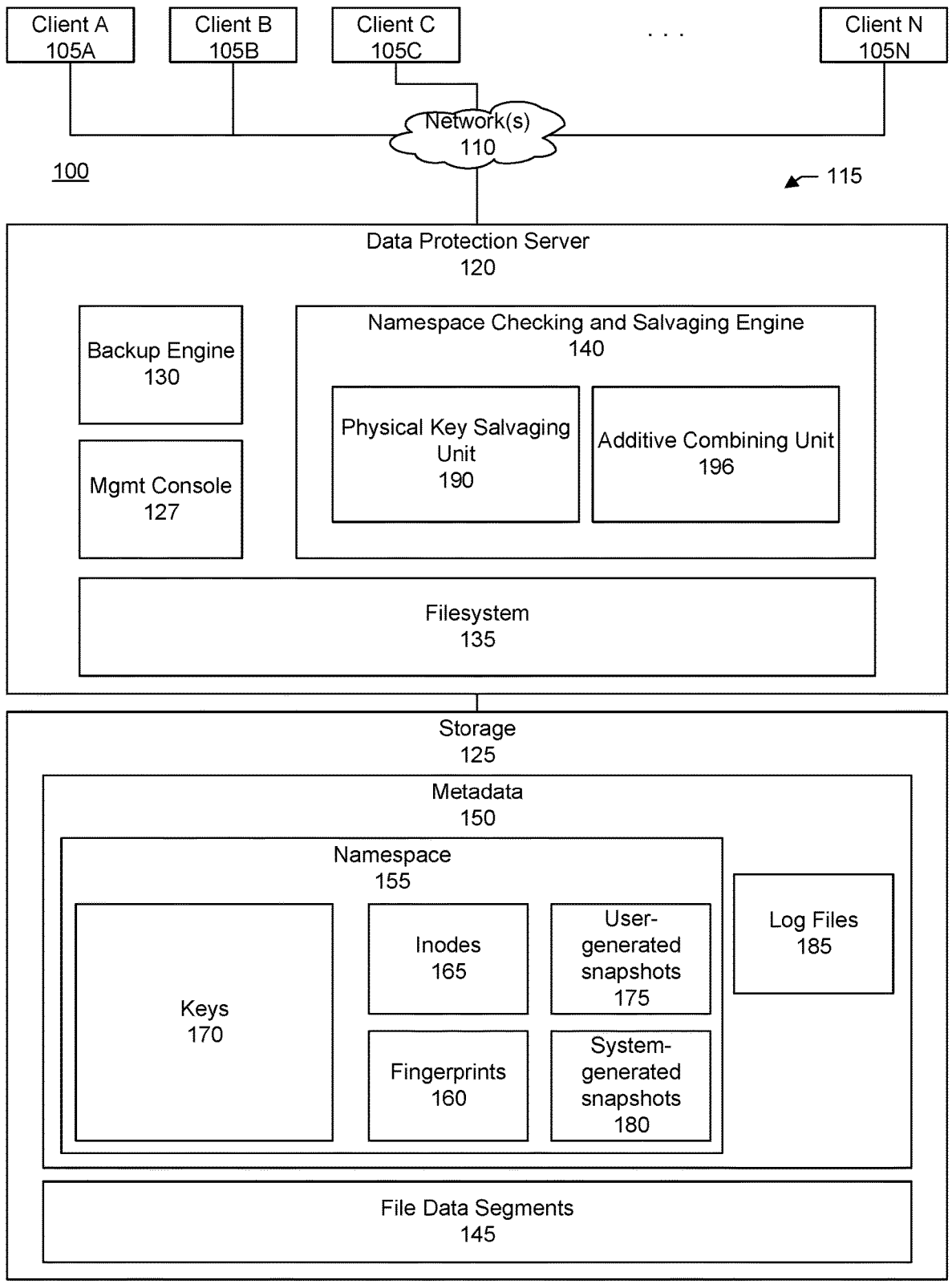
FIG. 1 shows a block diagram of an information processing system within which a namespace of a filesystem may be salvaged, according to one or more embodiments.

Ransomware cyber-attacks are a critical threat to user data in today's filesystems. While most modern filesystems are resistant to accidental corruptions, recovery, when files are intentionally deleted, is somewhat limited. Recovery of lost files is further complicated by the widespread use of B+ Trees for storing metadata, which can be rendered unusable by the corruption of few important elements. Filesystems that are used for backup are the storage asset of last resort and have the most to gain from improvements in recovery methodologies. In an embodiment, systems and techniques are provided for recovering data that is based on insights into the nature of B+ Tree in logging-based filesystems and how that knowledge can most effectively be utilized for cyber-attack recovery.

Ransomware cyber-attacks typically involve the deletion of user data. Most cybercriminals are aware that in logging-based filesystems some form of space reclamation (i.e., garbage collection (GC)) must be run to affect the permanent deletion of data. This can result in the corruption of the deleted namespace data structures making them unrecoverable. It remains, however, difficult to remove all traces of data from a modern filesystem, but it also becomes increasingly difficult to recover a full dataset due to the complexity of the data structures involved. By applying some innovative approaches to the recovery of namespace metadata (file names and pointers to file content) it can be possible to regain access to a much greater amount of lost data due to a cyber-attack as compared to previous recovery techniques.

Namespace data can be difficult to recover because B+ Trees, though fast and compact, are not easily reassembled when damaged or incomplete. Indeed, most recovery techniques involve rolling back to an earlier snapshot, which itself is an intact B+ Tree. In a cyber-attack however, the active namespace and its earlier snapshots are usually deleted by the miscreants. To deal with this situation two new techniques are presented here to recover the available data from the residue of earlier operations. In an embodiment, a first technique processes segments of damaged B+ Trees without regard to their structure, and instead searches them for embedded file metadata keys and then uses them in the construction of a new B+ Tree. This technique is referred to here as physical key salvage.

A second technique involves going back through the historical records or earlier residues and performing additive combining on a temporal basis. Under normal circumstances combining data from different generations is not considered desirable. In a rescue situation, however, providing access to all available data is of urgent need. Since internal logging sync operations occur regularly (e.g., every fifteen minutes) these along with formal snapshots form checkpoints that can be used for recovery purposes. Often only a small number of down-rev files (e.g., earlier file versions) need to be added to the file-set to allow the recovery of potentially hundreds of thousands of up-to-rev files that without this new technique would have been deemed unrecoverable.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

FIG. 1 shows a simplified block diagram of an information processing system 100 within which systems and techniques to salvage namespace metadata in logging-based filesystems may be implemented. As shown in the example of FIG. 1, a set of clients 105A-N are connected via a network 110 to a data protection backup system 115. The data protection system includes a data protection server 120 and storage system 125 connected to the data protection server. The storage system may be referred to as a backup or secondary storage system.

The data protection server includes a management console 127, backup engine 130, filesystem 135, and namespace checking and salvaging engine 140. The management console provides a user interface (UI) to the data protection system. The interface may be a graphical user interface (GUI), shell, or command line. The interface may be a programmatic interface such as an application programming interface (API). A user, such as an administrative user, can use the management console to administer, configure, and manage the system. This includes, for example, authoring data protection policies, defining backup schedules, identifying clients, files, and folders to be backed up, performing recoveries, and other management tasks.

The backup engine is responsible for backing up (e.g., copying) files on primary storage of the clients to secondary storage of the data protection system. The backed up files stored in secondary storage may be stored in a format that is different from a native format of the primary file copies at the clients. For example, backups may be stored in a compressed format, deduplicated format, or both.

Storage of the data protection system includes file data segments 145 and metadata 150. Metadata includes a namespace 155, fingerprints 160, inodes 165, keys 170, user-generated snapshots 175, system-generated snapshots 180, and log files 185.

The filesystem organizes the files and other data stored in the storage system and presents that data in a logical format to the clients and applications. In an embodiment, the filesystem is a logging-based filesystem. In a logging-based filesystem, new data written to the filesystem does not necessarily overwrite old data. A log is a type of data structure in which writes are made at a head of the log. Writes are made to disk sequentially in a log-like structure. Since disk space is finite, however, a space recovery mechanism referred to as a garbage collector can be periodically run to reclaim or recover disk space. Even so, running the garbage collection process does not necessarily delete old data. Rather, the garbage collection process marks locations or areas on disk that can be reused.

In a specific embodiment, the filesystem is a deduplicated filesystem. A deduplicated filesystem is a type of filesystem that can reduce the amount of redundant data that is stored. In a deduplication-based system, data such as files to be backed up are divided into a set of segments. The segments are hashed to generate a set of fingerprints. These fingerprints uniquely identify the segments. The data protection system maintains metadata separate from the actual client data being backed up. The metadata includes a collection of fingerprints corresponding to data segments that already exist on the backup storage system. If the fingerprint of a data segment from a file to be backed up does not match an existing fingerprint, the data segment is written to the physical disk storage of the storage system and the fingerprint is added to the collection of existing fingerprints. If, however, the fingerprint matches an existing fingerprint, the data segment is determined to be a duplicate and is not written to the storage system. Instead, a reference is generated that points to the already existing data segment on backup storage that corresponds to the fingerprint. The reference is stored as metadata by the data protection backup system so that the file can be reconstructed or reassembled as part of a restore operation.

Figure 2:
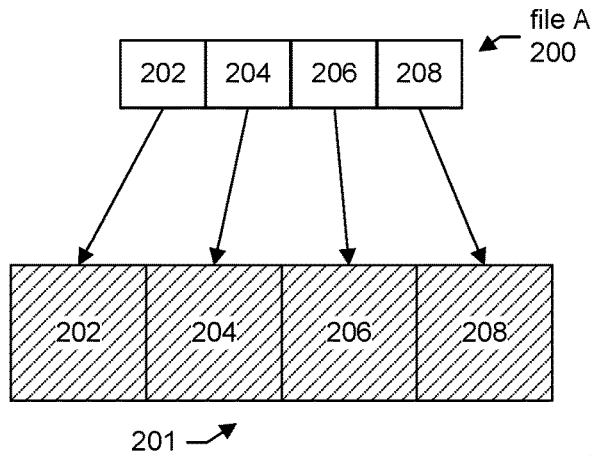
FIG. 2 shows an example of a deduplication process of a filesystem in a first state, according to one or more embodiments.
Figure 3:
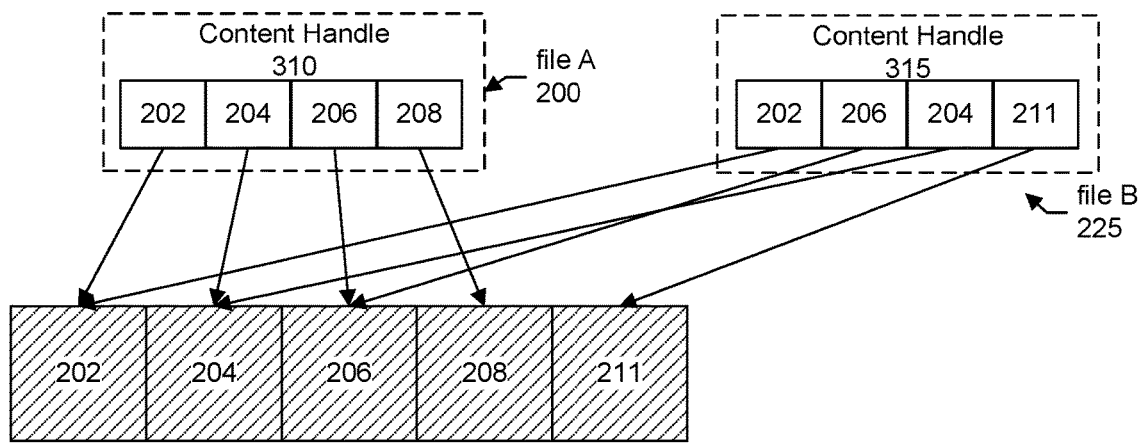
FIG. 3 shows an example of the deduplication process of the filesystem in a second state, according to one or more embodiments.

More particularly, FIGS. 2-3 show block diagrams illustrating a deduplication process of the filesystem according to one or more embodiments. FIG. 2 shows an example of the filesystem in a first state. As data, such as an incoming client user file A 200 enters the filesystem, it is segmented into data segments 201. Identifiers are calculated for the segments. In an embodiment, the identifiers include fingerprints. A cryptographic hash function (e.g., Secure Hash Algorithm 1 (SHA1)) is applied to the segments to calculate the fingerprints (e.g., SHA1 hash values) for each of the data segments making up the incoming file. In the example shown in FIG.

2, the fingerprints are 202, 204, 206, and 208. A fill pattern indicates the data segments corresponding to the fingerprints.

FIG. 3 shows an example of the filesystem in a second state, after the first state. A client user file B 225 has likewise been segmented into data segments. Fingerprints (202, 206, 204, and 211) have been calculated for each of the segments and filtered against existing segments to remove duplicates (e.g., duplicate segments 202, 206, and 204). New or non-redundant segments (e.g., 211) are stored. Thus, a segment not having matching fingerprints may be stored. A segment that happens to be the same as another segment (based on having matching fingerprints) may not be again stored. This helps to eliminate redundant data and conserve storage space.

Metadata, however, is generated and stored that allows the filesystem to reconstruct or reassemble the file using the already stored or previously stored and existing segments. Since the files share some identical segments, referencing the segments using the fingerprints allows a single instance of a particular segment to be stored, thus reducing redundant or duplicate data. The fingerprints or identifiers referencing the segments are substantially less in size that the actual data segments themselves.

Figure 4:
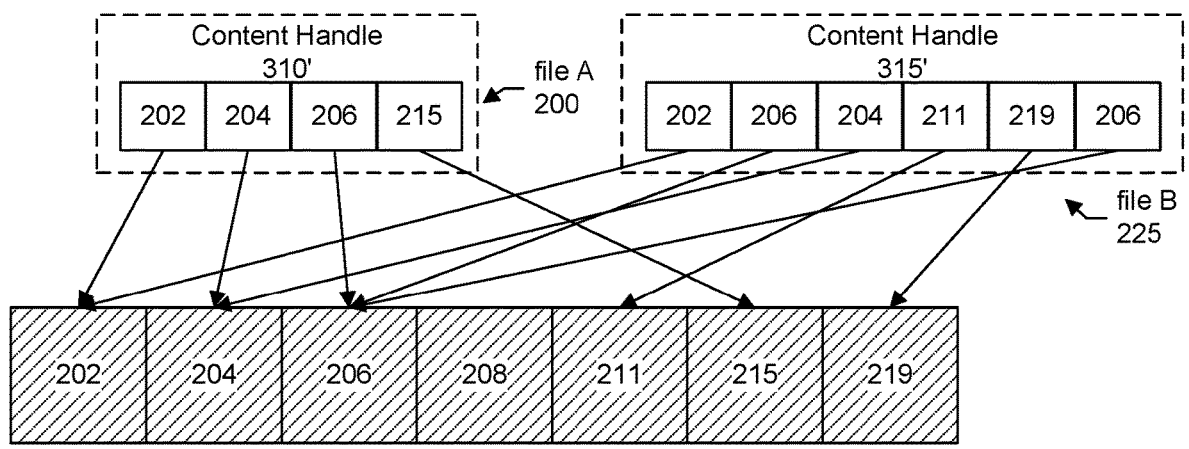
FIG. 4 shows an example of the deduplication process of the filesystem in a third state, according to one or more embodiments.

FIG. 4 shows an example of the filesystem in a third state, after the first and second states. In this example, the files have been modified such that file A references segment 215 instead of 208. File B references a new segment 219 in addition to segments 202, 206, 204, 208, and 211, and has an additional reference to segment 206.

Each file is associated with a content handle (CH) that represents data content of a file at a particular point-in-time. A content handle of a file may be generated based on an ordered collection of fingerprints corresponding to data segments making up the file. For example, referring back now to a state of the filesystem as shown in FIG. 3, file A has a content handle 310 based on fingerprints 202, 204, 206, and 208. File B has a content handle 315 based on fingerprints 202, 206, 204, and 211. In the example of FIG. 4, however, the content handles for files A and B are now 310' and 315', respectively, to indicate that they have changed based on their modifications. In other words, content handle 310 is different from content handle 310'; and content handle 315 is different from content handle 315'. A content handle may be viewed as a compact snapshot of a file's data contents. The content handle of a file thus encodes content of the file into a name of the file.

Referring back now to FIG. 1, the data protection system maintains, in addition to data segments of making up client files, other data to facilitate organization, search, point-in-time recoveries, and so forth.

Figure 5:
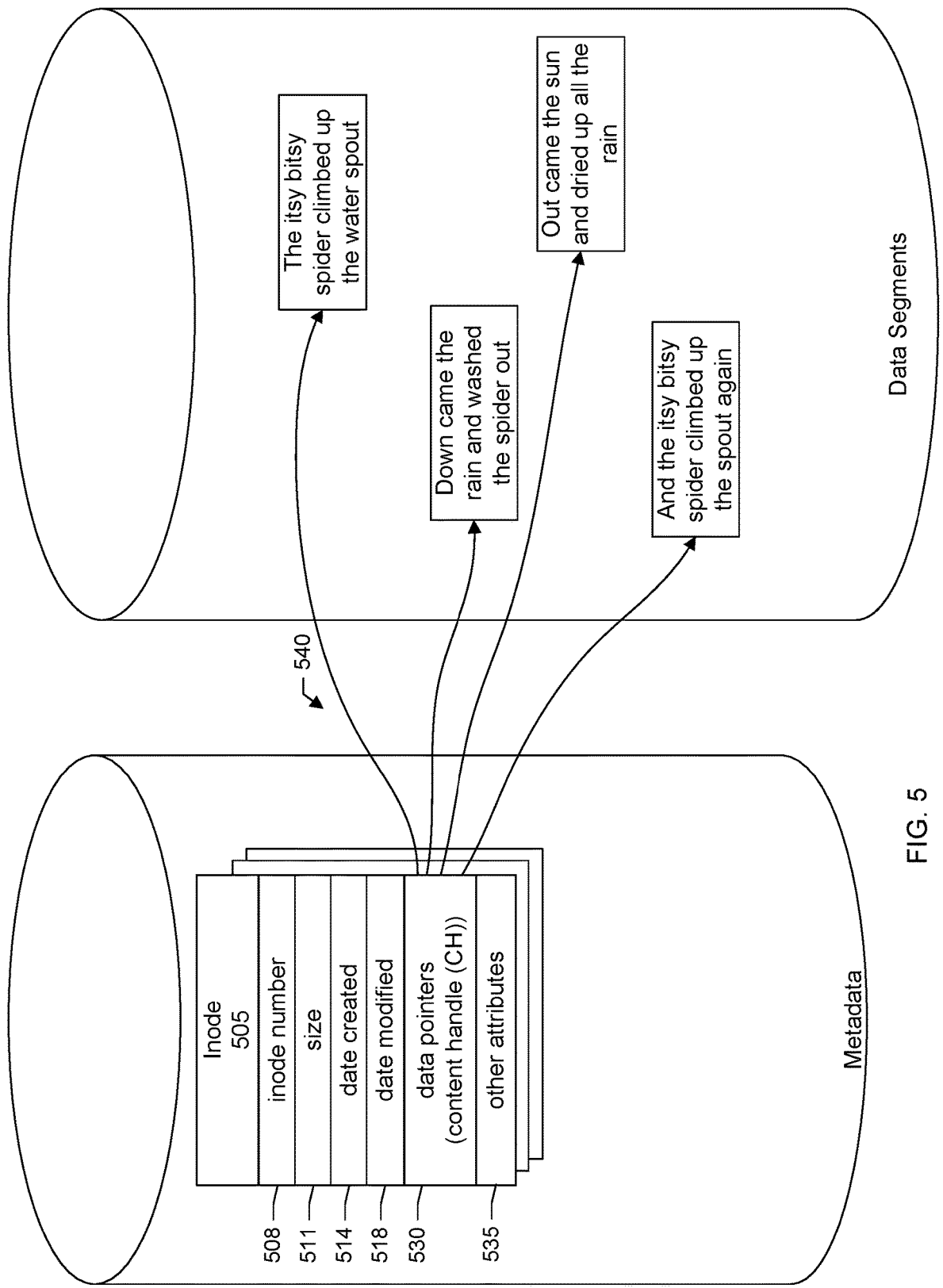
FIG. 5 shows a block diagram of an inode, according to one or more embodiments.

For example, an inode is a type of data structure that may be stored by the filesystem. In an embodiment, each file in the filesystem is associated with an inode. The inode associated with a file stores metadata about the file. FIG. 5 shows a block diagram of an inode 505. The inode includes an inode number 508. The inode number uniquely identifies the inode from among other inodes in the filesystem. Other attributes of the inode may include a size 511 indicating a size of a file associated with the inode, date created 514 indicating a time and date the file was created, date modified 518 indicating a time and date the file was last modified, a set of data pointers 530, and other attributes 535 (e.g., file owner, file permissions, and so forth). The data pointers store location information or addresses mapping 540 the inode to the actual data.

Referring back now to FIG. 1, the snapshots are point-in-time copies of the filesystem. Snapshots can be used to restore the filesystem to a previous state, preserve a moment in time for reference or for later use, assist with testing and debugging by reproducing a particular state of the filesystem, disaster recovery, and so forth. Snapshots can be created very quickly because they are logical rather than actual copies of data. For example, it can be much faster to designate an area on disk for a snapshot and use pointers to data as compared to copying the entire actual source data. In particular, a snapshot includes a set of reference markers or pointers to the actual data. There are many ways to generate a snapshot including copy-on-write (COW), redirect-on-write, clone or split mirror, and others.

User-generated snapshots refer to snapshots of the filesystem that are initiated by the user. For example, a user may configure a policy to generate snapshots every hour, every 2 hours, or any other time interval as desired. System-generated snapshots refer to snapshots of the filesystem that are initiated internally by the filesystem. For example, the filesystem may be configured to automatically take snapshots at periodic intervals (e.g., every 15 minutes). Again, such snapshots can be used to help recover the filesystem to a previous state.

The log files record events and activities that have occurred in the filesystem. In an embodiment, such events include the creation of snapshots including user-generated snapshots and system-generated snapshots. For example, a log file may record an identification of a snapshot (such as via a content handle associated with the snapshot), time and date the snapshot was taken, and so forth.

In an embodiment, a set of keys are generated for each file in the filesystem. A key is a metadata attribute associated with a file in the filesystem. These keys facilitate, among other things, organization and access to the files stored in the filesystem, maintenance of the hierarchical directory structure of the filesystem, tracking of files and directories on disk, locating the files, and so forth. Further discussion is provided below.

The namespace provides a hierarchical organizational structure for identifying filesystem objects through a file path. A file can be identified by its path through a structure of folders and subfolders in the filesystem. A filesystem may hold many millions of files across many different folders and subfolders and spanning thousands of terabytes. The namespace contains metadata for the files. The metadata may include, for example, file names, timestamps indicating when the files were modified, timestamps indicating when the files were created, pointers or references to file content, and so forth. In an embodiment, the namespace is held in a tree data structure and, more specifically, a B+ Tree. In an embodiment, the B+ Tree may be stored within a single file that is identified and accessed by a content handle. File lookups or verifications of the filesystem may be conducted with a logical walk of the B+ Tree. In a logical walk, the nodes or pages of the tree are accessed using pointers or references. The logical walk begins with a root of the tree and then proceeds down, level-by-level, to one or more intermediate pages, and eventually to leaf pages which contain the actual file metadata or pointers to reassemble a file.

Even when actual file content remains present, losing the namespace or even a portion of the namespace can make recovery of the actual file content very difficult because the namespace provides the structure and mapping of the actual file content back to the files including file names.

The namespace checking and salvaging engine is responsible for recovering the namespace in cases where, for example, the namespace or portions of the namespace have been damaged or corrupted or are missing. The namespace checking and salvaging engine includes a physical key salvaging unit 190 and an additive combining unit 196.

The physical key salvaging unit is responsible for conducting a "sequential scan" or "sequential traversal" of pages belonging or corresponding to a corrupted or incomplete tree structure to retrieve and copy out any keys into a new tree structure. The additive combining unit is responsible for conducting a search of other namespace metadata sources (e.g., snapshots) to locate keys that may be missing from the new tree structure and upon locating missing keys, copying the missing keys into the new tree structure.

The following are some highlights of a system and technique for conducting a namespace salvage according to one or more embodiments. In an embodiment, there is a smart physical walking of a corrupted B+ Tree to find salvageable keys for namespace recovery. This includes reading only leaf page keys and their payload; skipping reading any corrupted leaf pages from the disk and salvaging only good pages; and ignoring reading any internal pages or validating their correctness. In another embodiment, there is additive combining of multiple sources of namespace metadata for recovery purposes. This includes reading the newest tree first and moving towards the older one; picking the keys from an older tree only if it has not been read before; and additively combining the keys into a newer recovered tree. In another embodiment, there is intelligent scanning for snapshots and checkpoints for namespace recovery. This includes new tools to quickly get a list of checkpoints and snapshots in the reverse temporal order.

Figure 6:
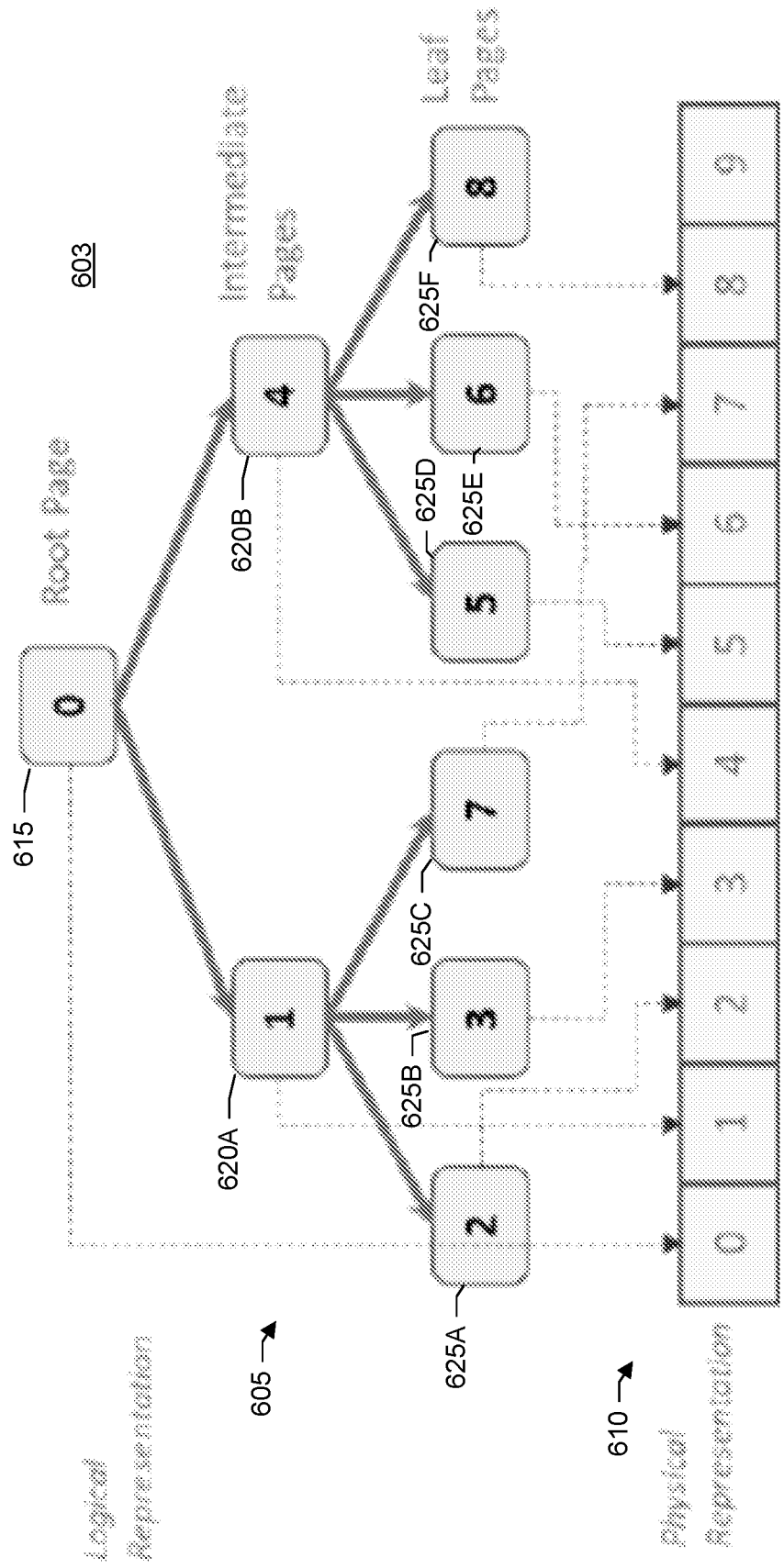
FIG. 6 shows a block diagram of a B+ Tree, according to one or more embodiments.

FIG. 6 shows an example of a B+ Tree 603 in a logical representation 605 and a physical representation 610. In this example, there is a root page 615, intermediate pages 620A,B, and leaf pages 625A-F. The broken lines shown in FIG. 6 map the pages from their logical representation in the tree to their physical representation as a linear sequential set of pages on disk, e.g., flattened on-disk layout. In other words, the tree may be represented as a line of pages of data. A physical walk thus involves linearly traversing the line of pages, page after page, in a sequential manner.

A B+ Tree is a self-balancing tree data structure that may be used for indexing and storing large amounts of data. In a B+ Tree, each page or node can have multiple children (e.g., dozens, hundreds, or even many thousands). In an embodiment, leaf pages of a B+ Tree contain an ordered listing of keys having corresponding values that are pointers to the actual data records, while the non-leaf pages (e.g., intermediate pages or pages at a level above the leaf pages) act as indexes or pointers to other nodes or pages. In other words, leaf pages are at a bottom-most level of the tree and contain or point to the actual data records using key-value pairs.

Filesystem metadata such as the names of files and their attributes are frequently stored in B+ Trees. B+ Trees are used for metadata in filesystems from Apple and Microsoft. Linux filesystems such as EXT4, XFS, BTRFS, and HPFS also use B+ Trees for namespace metadata. The techniques described here apply to all these examples and particularly those that are logging-based. Logging filesystems usually implement a copy-on-write scheme where new data does not overwrite old data but rather allocates new data blocks for that purpose. That means that old data tends to remain present even after space has been salvaged via garbage collection (GC). Even when GC has run, recoverable data is still present in disk free lists that can be salvaged with the methods described here up until the time that those blocks are actively put into use to store new data. The Data Domain Filesystem (DDFS), as provided by Dell Technologies, contains all these attributes. While some embodiments are described in conjunction with the Data Domain Filesystem, it should be appreciated that aspects and principles of the systems and techniques described herein can be applied to other filesystems.

In an embodiment, the Data Domain Filesystem supports manageable file sets called an MTree. These are practically standalone filesystems inside a larger filesystem that encloses them. Other commercially available filesystems contain a similar feature. As many as 256 separate Mtrees can exist in each instance of DDFS. An MTree is a set of files in a self-contained file set and each MTree will act as a mount point. Mtrees are represented internally as a B+ Tree with 3 intermediate levels (for simplicity the example shown in FIG. 6 shows a single intermediate level).

A Mtree's underlying data structure is a B+ Tree with the following factors:
1) A B+ Tree is a balanced tree of fixed depth.
2) Each node in the tree is a fixed-size "page" of 64 KB.
3) Pages refer to each other via "page number" (e.g., 0-8). For example, root page 0 refers to intermediate pages 1 and 4. Intermediate page 1 refers to leaf pages 2, 3, and 7. Intermediate page 4 refers to leaf pages 5, 6, and 8.
4) The physical representation is a linear area of pages that gets written to disk.

The fact that the B+ Tree in flattened form is essentially just a single linearly addressed segment of space means for certain operations it can be traversed linearly.

Intermediate Page Keys

The intermediate or internal page stores lookup keys and references to the leaf pages. The intermediate page does not store any file metadata that is needed for recovery. An intermediate page may be referred to as an INT page.

Leaf Page Keys

In an embodiment, the actual file metadata, the traditional inode as it were, is contained in the B+ Tree leaf page. The leaf page itself contains "key/value" pairs. A key is a 128-bit number kept in sorted order on the page. It is accompanied by a "value" which is an index to data associated with that key and may be referred to as a "payload." Thus, the keys in each leaf page are ordered and each leaf page may include a range of keys. In an embodiment, the 128-bit key is composed of a 64-bit PID, or parent file ID, and a 64-bit CID, or child file ID, which is the inode number of the actual file.

FIG. 7 shows an example of a leaf page 705 including some keys held by the leaf page and payloads corresponding to the keys. Payloads represent the actual metadata. The placement of the keys for a file is a relevant consideration in this design. In an embodiment, four keys are created for each file. Thus, as shown in example of FIG. 7, keys 710A-D have been created for a file "/a." First key 710A may be referred to as a CHILD key. Second key 710B may be referred to as a DIRENT key. Third key 710C may be referred to as a CS_HASH key. Fourth key 710D may be referred to as CI_HASH key.

Each key is tagged with an identifier (ID) 711 that identifies a parent and an actual file ID. For example, for the identifier "<10:12>" as shown in the example of FIG. 7, the value "10" identifies a parent or directory that file "/a" resides in, and the value "12" identifies the actual file ID or inode number. Thus, the first value may be referred to as a parent ID (PID) and the second value may be referred to as a child ID (CID). As shown in the example of FIG. 7, a payload of the CHILD key contains the ID of the parent (e.g., "10"). A key may further contain a hash 715, a size 720 of the payload, an offset 725 identifying a location in the page where the payload resides, and a checksum 730 calculated from the key and accompanying data so as to make the key self-identifying. In other words, the checksum may be calculated based on the type of key, ID, hash, size, and payload, or combinations of these.

The CHILD key contains inode type information including the tag, a DIRENT which contains the file's name, and two hash keys. The CS_HASH key contains a hash of the file name in a case-sensitive way, and the CI_HASH contains a case-insensitive hash of the same. Given that the tag contained in the CHILD key, and is encoded PID: CID, it can only be involved in filtering the other PID: CID keys since they are nearby. Those keys which are PID: hash format will be located elsewhere in the B+ Tree for a given file.

In an embodiment, a file is associated with at least first and second keys. The first key references a payload containing a pointer to content or data of the file. The second key is a key separate or different from the first key and references a payload containing a name of the file. In another embodiment, a file is associated with additional keys including a third key, fourth key, or both. The third key contains a case-sensitive hash of the name of the file. The fourth key contains a case-insensitive hash of the name of the file. These additional keys can be used to speed lookups of files using a case-sensitive technique or a case-insensitive technique. The case-insensitive technique can be used to support filesystems such as Windows by Microsoft Corporation which have case-insensitive protocols. Thus, third and fourth keys can be recreated so long as the key containing the name of the file (e.g., second key) can be salvaged.

File Metadata/File Name Distinction

As described above, in an embodiment, four keys are generated when a file is created. Inode information for the file is stored in a CHILD key and its name information is stored in the DIRENT, CSHASH, and CIHASH keys. A file can have two or more names (referred to as "hard links") and that set of three keys can be in some other part of the B+ Tree (on a different leaf page). When a file is renamed, a new set of keys is created in this fashion, followed by the removal of the original three file-name-related keys. All the time the original CHILD key remains logically in the same location in the hierarchy. This separation of file metadata information and file name information can be problematic during inadvertent or intentional metadata corruption, where a file can be left orphaned without a corresponding name, or a name no longer references an existent file.

In an embodiment, recovery of namespace metadata includes physical key salvage, additive combining, and automated checkpoint selection.

Physical Key Salvage

Filesystems store their metadata in a B+ Tree (Mtree) and the cyber-attacks can delete random pages from the tree leading to namespace corruption. Under these circumstances abandoning a logical walk of the tree structure entirely and taking a shortcut to find recoverable data is in order. Physical key salvage fits this bill and involves sequentially reading the data that stores the B+ Tree and skipping over either corrupt or structural data and searching only for keys specific to individual file data. Given that leaf-pages store the keys and the metadata information about the user files they are the primary data needed for recovery.

Intermediate pages and other structural components of the source B+ Tree and any other bad data including corrupt leaf pages can be ignored during a physical walk. The intermediate (INT) pages, though normally used to find the leaf pages, are indexes and do not contain any file data. On a high-end enterprise filesystem, a single INT page can reference about 5000 leaf pages, which means that the loss or corruption of that page could result in the loss of hundreds of thousands of files. In a filesystem, such as DDFS, with three levels of intermediate pages, the loss of a top-level intermediate page can result in the loss of many millions of files.

Figure 8:
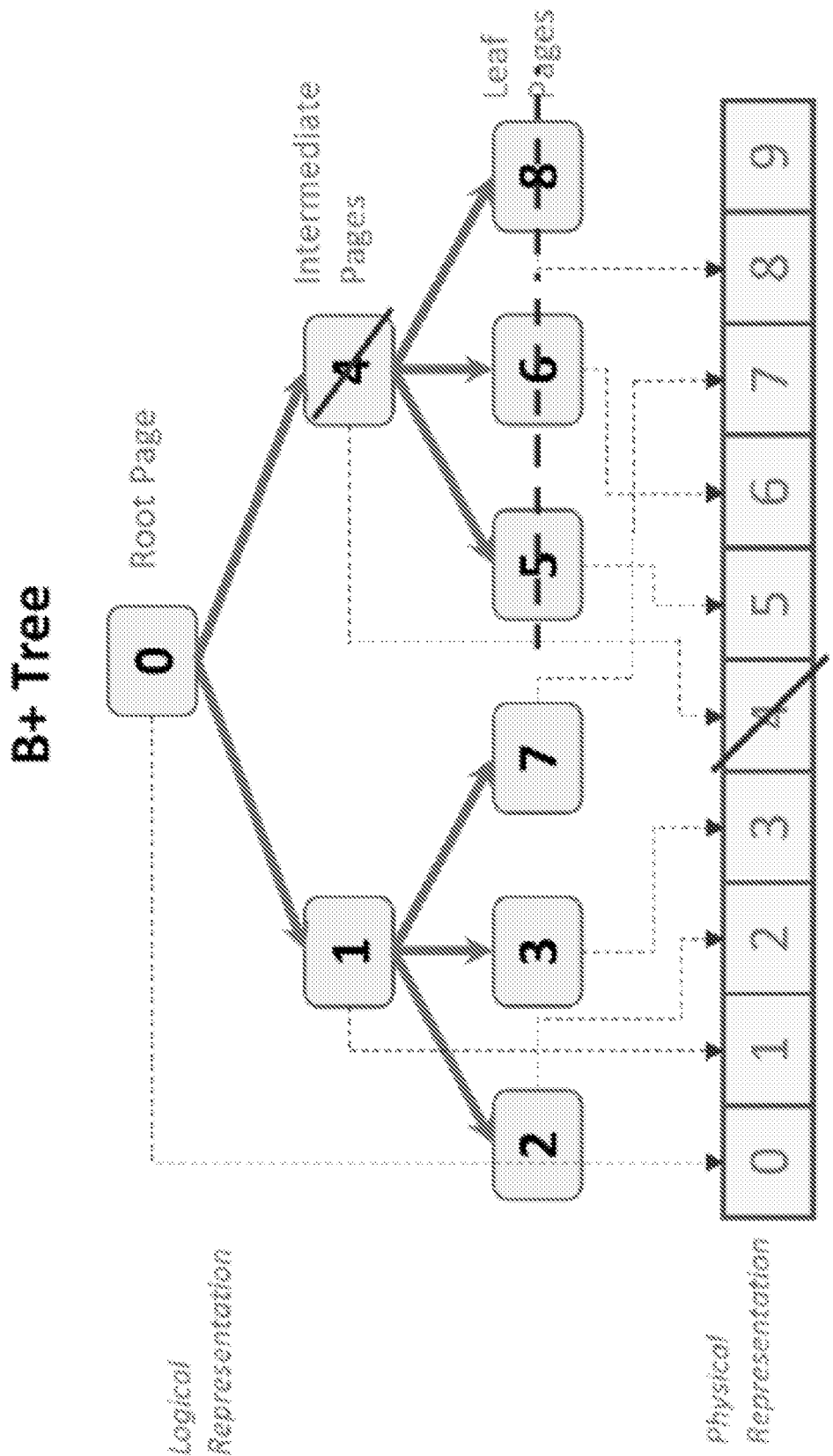
FIG. 8 shows a block diagram of the B+ Tree with a corrupt intermediate page, according to one or more embodiments.

For example, FIG. 8 shows an example of the tree structure shown in FIG. 6 where intermediate (INT) page 4 is corrupted and thus in a normal B+ Tree traversal its leaf pages 5, 6, and 8 would be inaccessible. In the figure, a diagonal slash indicates a corruption of intermediate page 4. A thick horizontal broken line indicates that leaf pages 5, 6, and 8 referenced by corrupted intermediate page 4 cannot be reached by traversing the tree. Leaf pages 5, 6, and 8, however, remain uncorrupted in their physical or linear on-disk representation.

A single leaf page can reference about 200 files. As discussed, a single intermediate page can reference about 5000 leaf pages. Thus, the loss or a corruption of an intermediate page could result in the loss of hundreds of thousands of files or even millions depending on the level at which the intermediate page resides in the tree. In other words, conducting a logical walk to recover a tree can result in leaf pages 5, 6, and 8 not being found because intermediate page 4 is corrupt. The physical walk (or linear traversal), however, does not rely on the tree structure when collecting keys from a leaf page. Keys from leaf pages 5, 6, and 8 can be found, harvested, and salvaged even though the leaf pages are referenced by a corrupted intermediate page (e.g., intermediate page 4). Indeed, intermediate pages, whether corrupt or not corrupt, are ignored during the physical walk.

Physical Key Salvage Processing

Figure 9:
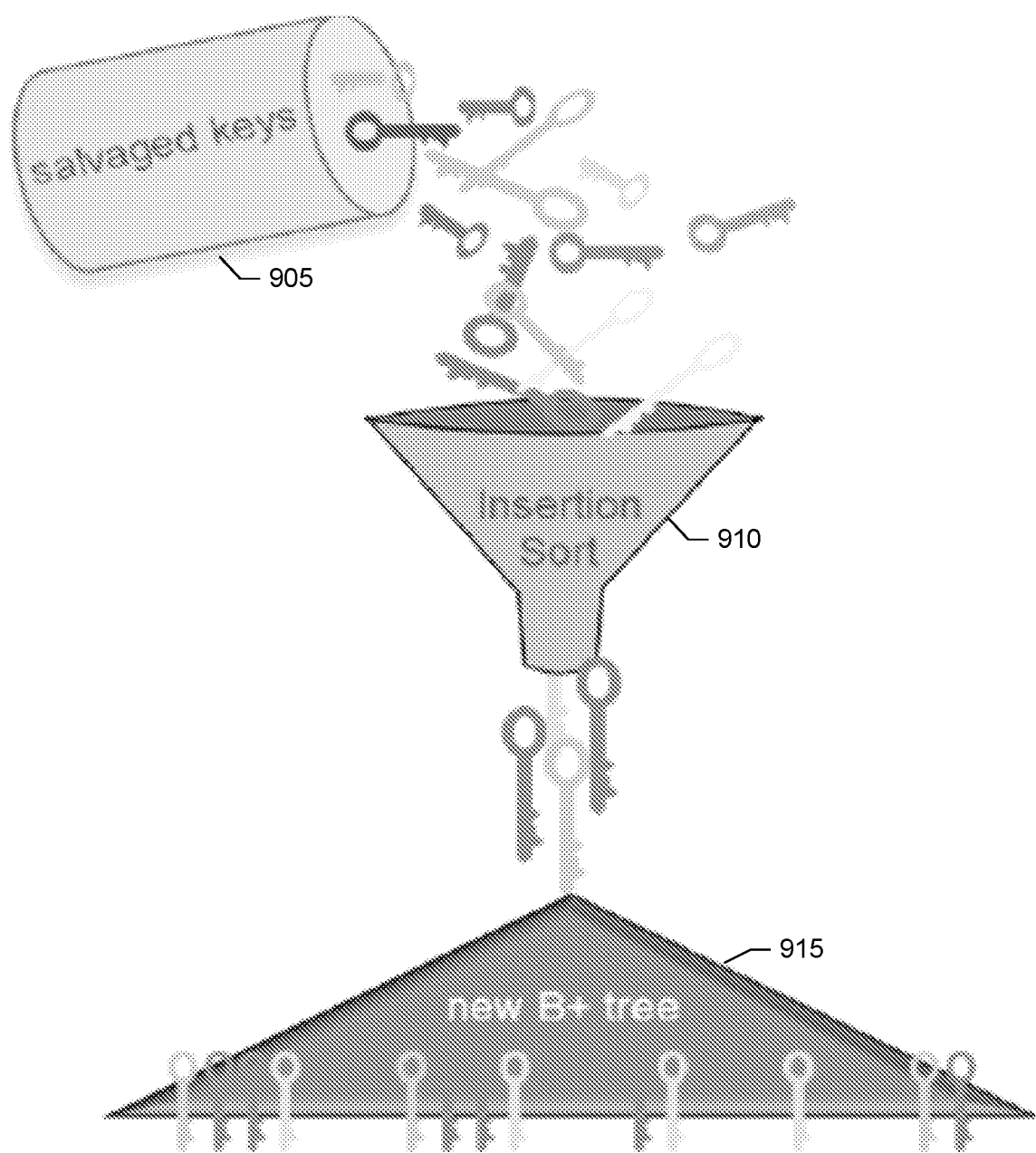
FIG. 9 shows a block diagram of physical key salvage, according to one or more embodiments.
Figure 10:
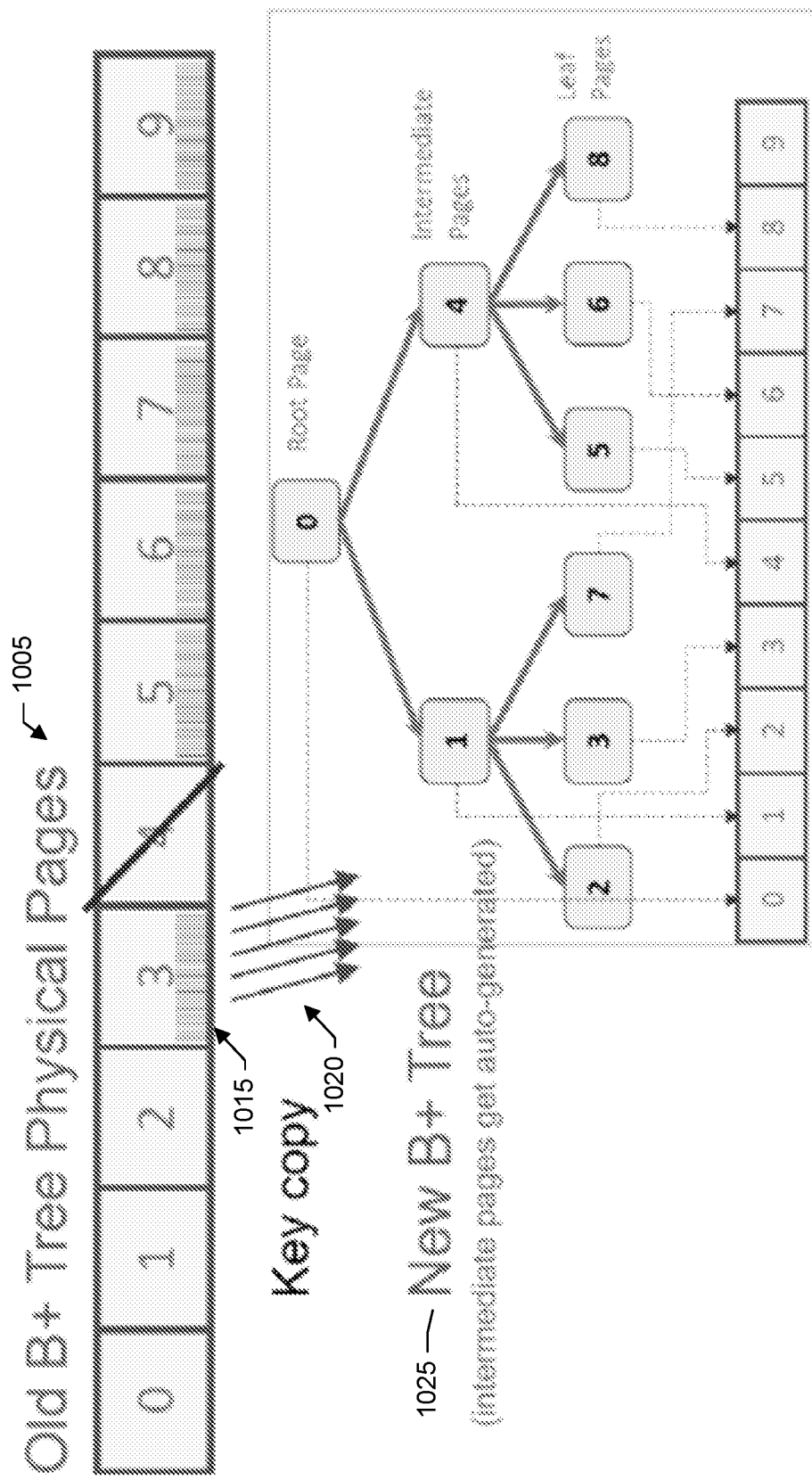
FIG. 10 shows a block diagram of copying leaf page keys into a new B+ Tree, according to one or more embodiments.

In an embodiment, file metadata, as discussed, is stored as monotonically increasing keys that are unique and self-identifying. This means keys can be retrieved from the good/uncorrupted leaf pages by performing a physical walk on the tree and not reading any INT pages. This is because the INT pages only contain references to the leaf pages and no information about user files. Corruption in the INT page has no consequence in losing data and all the user files can be recovered by only reading the leaf pages. FIGS. 9 and 10 show the salvaged metadata keys being copied from all the good leaf pages into the new B+ Tree, thus ignoring any corrupted INT and leaf pages.

As shown in the example of FIG. 9, keys 905 salvaged or retrieved from uncorrupted leaf pages of a damaged tree are provided to an insertion sorting engine 910. The insertion sorting engine sorts the keys (e.g., sorts in increasing order) and inserts the keys according to their sort order in a new tree (e.g., MTree or B+ Tree) 915. The new MTree (or B+Tree) copies out the keys into its new leaf pages and auto-generate its INT pages.

In an embodiment, a method includes: scanning a set of pages arranged in a linear sequence, the set of pages belonging to a tree structure that has been damaged and comprising intermediate pages and leaf pages, referenced by the intermediate pages, the leaf pages being at a lowest level of the tree structure and comprising a plurality of keys having corresponding payloads; upon encountering a page in the linear sequence that is corrupted, skipping the corrupted page and scanning a next page immediately after the corrupted page in the linear sequence; upon encountering a page in the linear sequence that is an intermediate page, skipping the intermediate page and scanning a next page immediately after the intermediate page in the linear sequence; and upon encountering a page in the linear sequence that is a leaf page and not corrupted, harvesting the plurality of keys in the leaf page and inserting the harvested plurality of keys into a new tree structure, regardless of whether the leaf page is or is not referenced by an intermediate page that is corrupted. The keys may be inserted into the new tree structure according to a sort order.

FIG. 10 shows another example of physical key salvage processing. FIG. 10 shows a physical representation 1005 of an old, corrupted, incomplete, or damaged B+ Tree. This tree is similar to the tree shown in FIG. 8. As discussed, the physical representation is a linear set of pages written to disk. A technique of physical key salvaging includes a sequential scan or traversal of the linear pages, rather than a logical traversal of the nodes of the tree. That is, the hierarchical arrangement of the pages is ignored. Thus, the sequential scan begins with page 0, followed by page 1, followed by page 2, followed by page 3, and so forth.

More particularly, a scan of page 0 indicates that page 0 is a root page. Thus, page 0 is ignored. A scan of page 1 indicates that page 1 is an intermediate page. Thus, page 1 is ignored. A scan of page 2 indicates that page 2 is an intermediate page. Thus, page 2 is ignored. A scan of page 3 indicates that it is a leaf page and that it is uncorrupted. A set of short vertical lines indicate keys 1015 from the leaf page. These keys are copied 1020 into a new tree 1025. This process continues until all pages of the old or damaged tree have been scanned. The resulting MTree (or B+ Tree) is free of any corruption and the files are recovered. The only data loss is due to the inability to access several corrupted leaf pages which are addressed in the following section.

Snapshot Selection During Corruption Recovery

A conventional method of recovery is to locate the most recent snapshot and roll the entire tree (e.g., Mtree) back to that point-in-time image. If that image is corrupt, however, recovery operations are then directed toward recovering from an earlier instance. There may be dozens of such instances to choose from given the frequency of snapshot operations as well as the internal generation of checkpoints during data flushes, which can also be used for recovery. The problem is that in a cyber-attack corruption can end up scattered randomly across the physical pages of these B+ Tree instances and there is no telling which one will provide the most faithful reproduction of the user's data.

Figure 11:
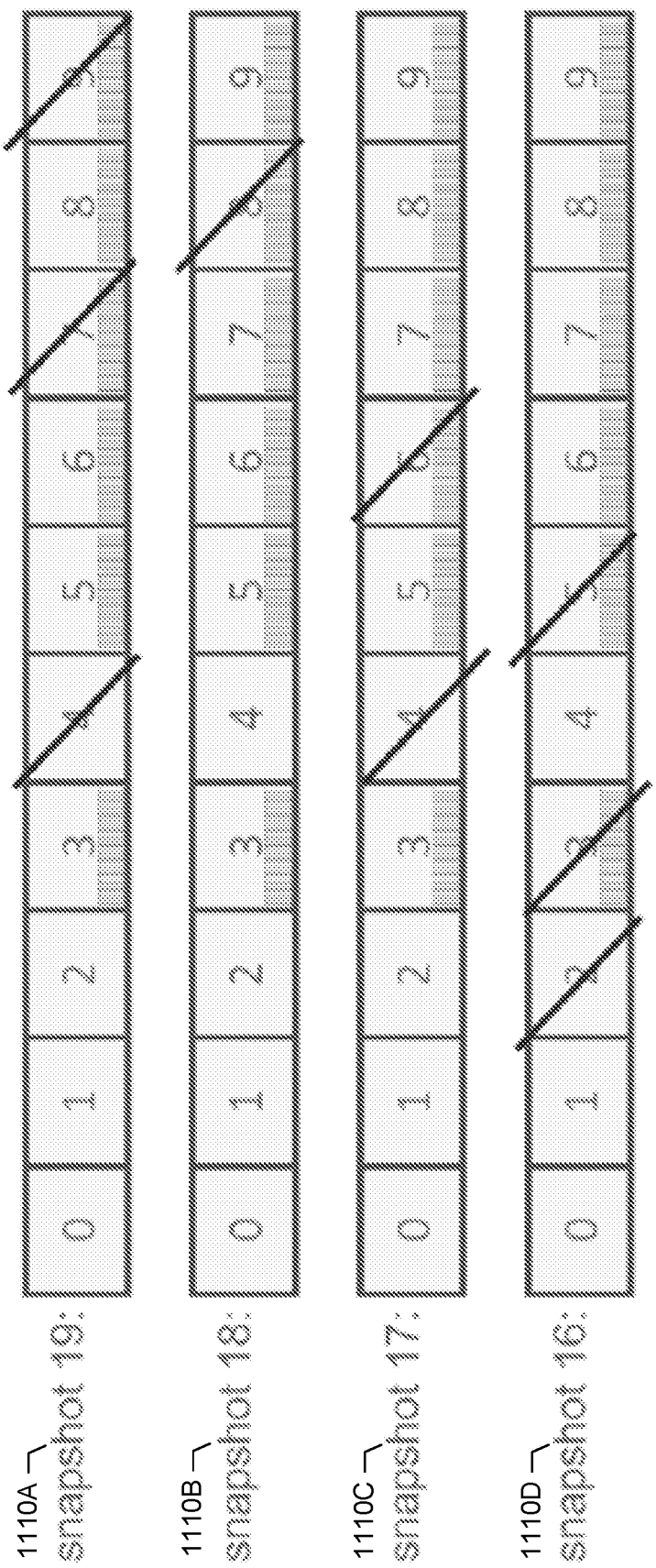
FIG. 11 shows an example of corruption in multiple snapshots of the B+ Tree, according to one or more embodiments.

For example, FIG. 11 shows a set of snapshots 1110A-D taken of a tree—e.g., tree 603, FIG. 6—over a period of time. Each snapshot is identified by an identifier (ID). Snapshot 19 (1110A) is the most recent snapshot and snapshot 16 (1110D) is the oldest snapshot. In other words, snapshot 16 (1110D) was taken at a first time. Snapshot 17 (1110C) was taken at a second time, after the first time. Snapshot 18 (1110B) was taken at a third time, after the second and first times. Snapshot 19 (1110A) was taken at a fourth time, after the third, second, and first times. For example, snapshot 19 may have been taken 15 minutes ago. Snapshot 18 may have been taken a day ago. Snapshot 17 may have been taken a week ago. Snapshot 16 may have been taken a month ago. A diagonal slash indicates pages that are corrupted.

As discussed, page 0 is a root page. Pages 1, 2, and 4 are intermediate pages. Pages 3, 5, 6, 7, 8, and 9 are leaf pages. These leaf pages hold keys that are shown in the figure as a set of short vertical lines. In snapshot 19, pages 4, 7, and 9 are corrupt. In snapshot 18, page 8 is corrupt. In snapshot 17, pages 4 and 6 are corrupt. In snapshot 16, pages 2, 3, and 5 are corrupt. The corrupted pages are spread across all these snapshots.

Additive Combining for Metadata Recovery

The challenge of selecting the right snapshot/frozen checkpoints can be sidestepped by taking another approach-choosing them all! Consider, as an example, the mindset of a user that has had their data stolen. Applicant has appreciated that users when given the choice may be willing to substitute some quality of data recovered for quantity. For example, if given the choice between recovering only 10 percent of their data from a precise time point versus recovering 80-90 percent of their data spread over a few days, they are usually willing to accept that tradeoff. In those cases, the method of combining the keys from several snapshots that are discussed below can be compelling.

Additive Combining of Keys from Multiple Snapshots

Additive combining works by applying sequential runs of physical key salvaging over several instances of the same B+ Tree. First, the newest instance is salvaged for keys, followed by increasingly older instances. Old data however is not allowed to overwrite newer data, but it is used to fill gaps in the dataset that is being assembled. Only keys which are not already in the freshly created B+ Tree get inserted, thus rejecting older keys from the earlier formed snapshot. This results in the freshly created Mtree (or B+ Tree) being as up-to-date as possible (given that some of the most recent data may, due to the cyber-attack, be lost).

Figure 12:
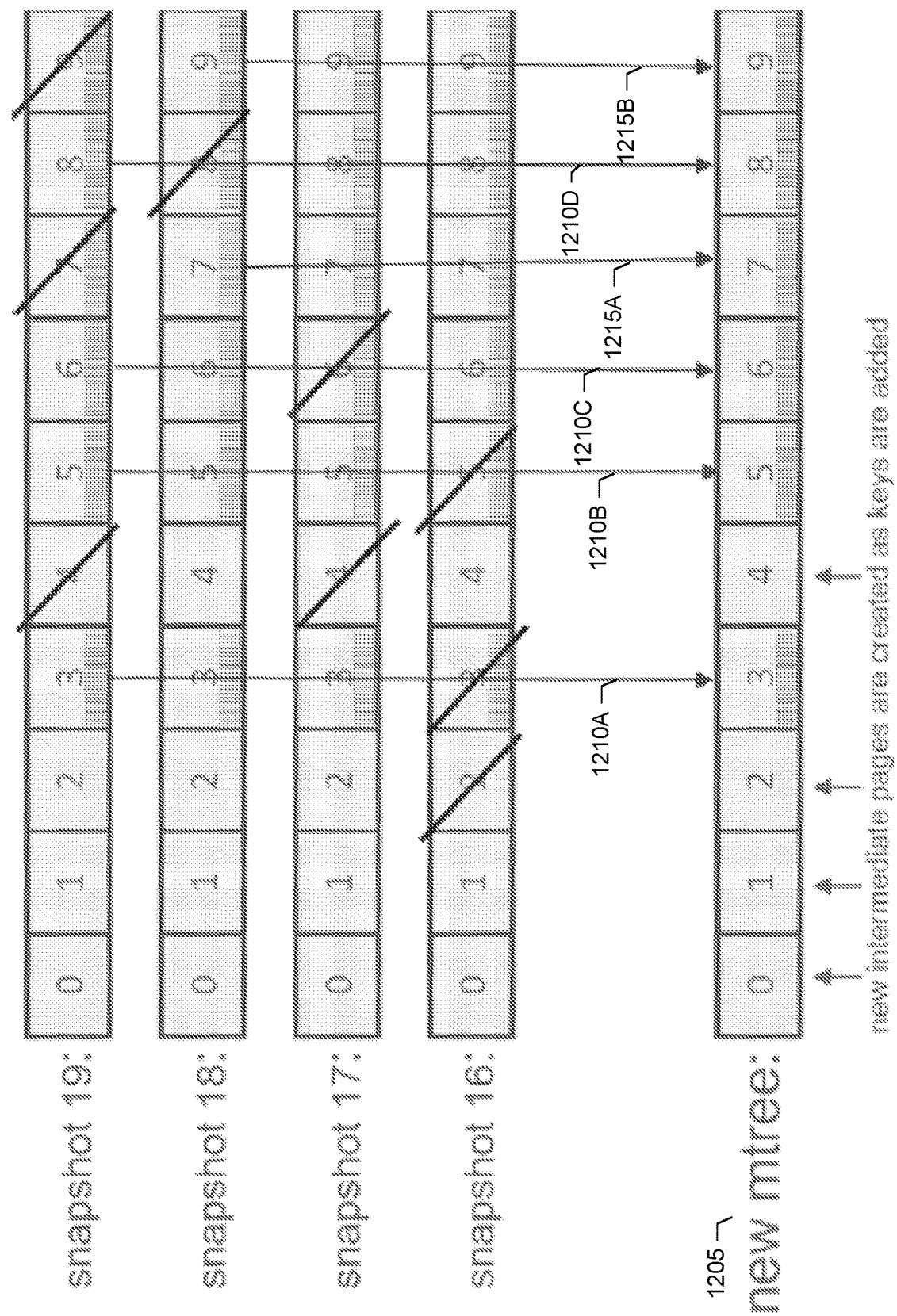
FIG. 12 shows a block diagram of choosing keys from multiple snapshots and copying into the new B+ Tree, according to one or more embodiments.

For example, FIG. 12 shows an example of additive combining of keys from the multiple snapshots of FIG. 11 to create a new tree 1205. Keys from leaf pages 3, 5, 6, and 8 are copied from snapshot ID 19, and keys from leaf pages 7 and 9 are copied from snapshot ID 18, and so on. The resulting MTree (or B+ Tree) is fully recovered and free from any corruption. The insert mechanism into the new MTree (or B+ Tree) creates new leaf pages to insert the keys while the INT pages are auto-generated to form a complete structure of a B+ Tree.

More particularly, a first sequential run includes salvaging keys from a most recent snapshot, e.g., snapshot 19. As part of the first sequential run, keys from leaf pages 3, 5, 6, and 8 of snapshot 19 are copied 1210A-D into the new tree. Keys from leaf pages 7 and 9 of snapshot 19 are not copied into the new tree because these pages are corrupt.

A second sequential run, after the first sequential run, includes salvaging keys from a next most recent snapshot, e.g., snapshot 18. As part of the second sequential run, keys from leaf pages 7 and 9 of snapshot 18 are copied 1215A,B into the new tree structure. Keys from leaf pages 3, 5, 6, and 8 of snapshot 18 are not copied into the new tree structure because the keys have already been copied from a more recent snapshot (e.g., snapshot 19). Older keys do not overwrite newer ones. Also, leaf page 8 of snapshot 18 is corrupt.

A third sequential run, after the first and second sequential runs, includes salvaging keys from a next most recent snapshot, e.g., snapshot 17. Again, keys from leaf pages 3, 5, 6, 7, 8, and 9 of snapshot 17 are not copied into the new tree structure because the keys have already been copied from more recent snapshots (e.g., snapshots 18 and 19). Also, leaf page 6 of snapshot 17 is corrupt.

A fourth sequential run, after the first, second, and third sequential runs, includes salvaging keys from a next most recent snapshot, e.g., snapshot 16. Again, keys from leaf pages 3, 5, 6, 7, 8, and 9 of snapshot 16 are not copied into the new tree structure because the keys have already been copied from more recent snapshots (e.g., snapshots 18 and 19). Also, leaf pages 3 and 5 of snapshot 16 are corrupt.

Additive Combining and Name/File Separation

The additive combining of keys is particularly helpful when the file data information stored in the CHILD key (also referred to as the "inode") is on a different page than the name information stored in the DIRENT, CIHASH, and CSHASH keys, and one or the other is lost. Where one snapshot might have the inode information and the other has the name information the cumulative combining of this information can allow files to be salvaged that would otherwise be lost. Since the DIRENT has all the name information needed and the CIHASH and CSHASH are speedups for file-name lookup, if the hash key is lost, they are recreated from the DIRENT entry. New recovery-specific names are created for inodes that are not referenced by at least one DIRENT (i.e., files without names). When file names are recovered but not their actual file information (i.e., names without files), a zero-length file is created with "mode 0", and its name is logged so that the users know which information must be recreated from scratch (or recovered from some other location).

A new tree may include leaf pages having keys corresponding to most recent versions of values and keys corresponding to older versions of the values or payloads. The keys corresponding to older versions of the values may include keys harvested from different snapshots taken at different points-in-time. For example, there can be a key harvested from a first snapshot taken at a first point-in-time. There can be a key harvested from a second snapshot taken at a second point-in-time, different from the first point-in-time. The second point-in-time may be after the first point-in-time. That is, the first point-in-time may be before the second point-in-time. Further, that each snapshot may have some pages that are corrupted does not necessarily mean that the entire snapshot is discarded. Instead, as discussed above, keys from leaf pages may still be salvaged during a sequential scan or traversal of linearly arranged pages even if the leaf pages are referenced in the tree by intermediate pages that are corrupt.

Snapshot Collection for Recovery Purposes

The checkpoints (e.g., content handle (CH)) are collected by scanning the filesystem log file and filtering for the source B+ Tree. In an embodiment, a script is executed to dump these CHs in chronological order into a file. The CH list is fed to the namespace checker in salvage mode one at a time. Since it is performing a physical walk on the source B+ Tree (e.g., sequential scan or sequential traversal), it is necessary to open the root and read the maximum number of pages available for recovery. The CH is skipped if the root is corrupted. Obtaining the maximum number of pages available for recovery provides the number of times needed to loop through a set of linearly arranged pages on disk, thereby scanning all the pages and stopping when all the pages have been scanned.

Key Recovery Process

For every CH, the recovery procedure walks the B+ Tree physically (i.e., sequentially scans or traverses a set of linearly arranged pages belonging to a tree) and reads only the leaf pages thus ignoring the INT pages entirely. The walk starts from page number 1 and loops until the given maximum number of pages. For every uncorrupted leaf page, the key recovery process extracts the keys, verifies its checksum, and inserts them into the new B+ Tree. In an embodiment, any corrupted leaf page is ignored from recovery. If a subsequent CH is being read, it is important to check the existence of these keys in the new B+ Tree to avoid overwriting the newer content. This process is repeated for all the CHs given in the input CH list. The technique provides for reading multiple CHs (or, more particularly, snapshots) and salvaging as much data/keys as possible before completing the recovery and bringing up the filesystem.

Figure 13:
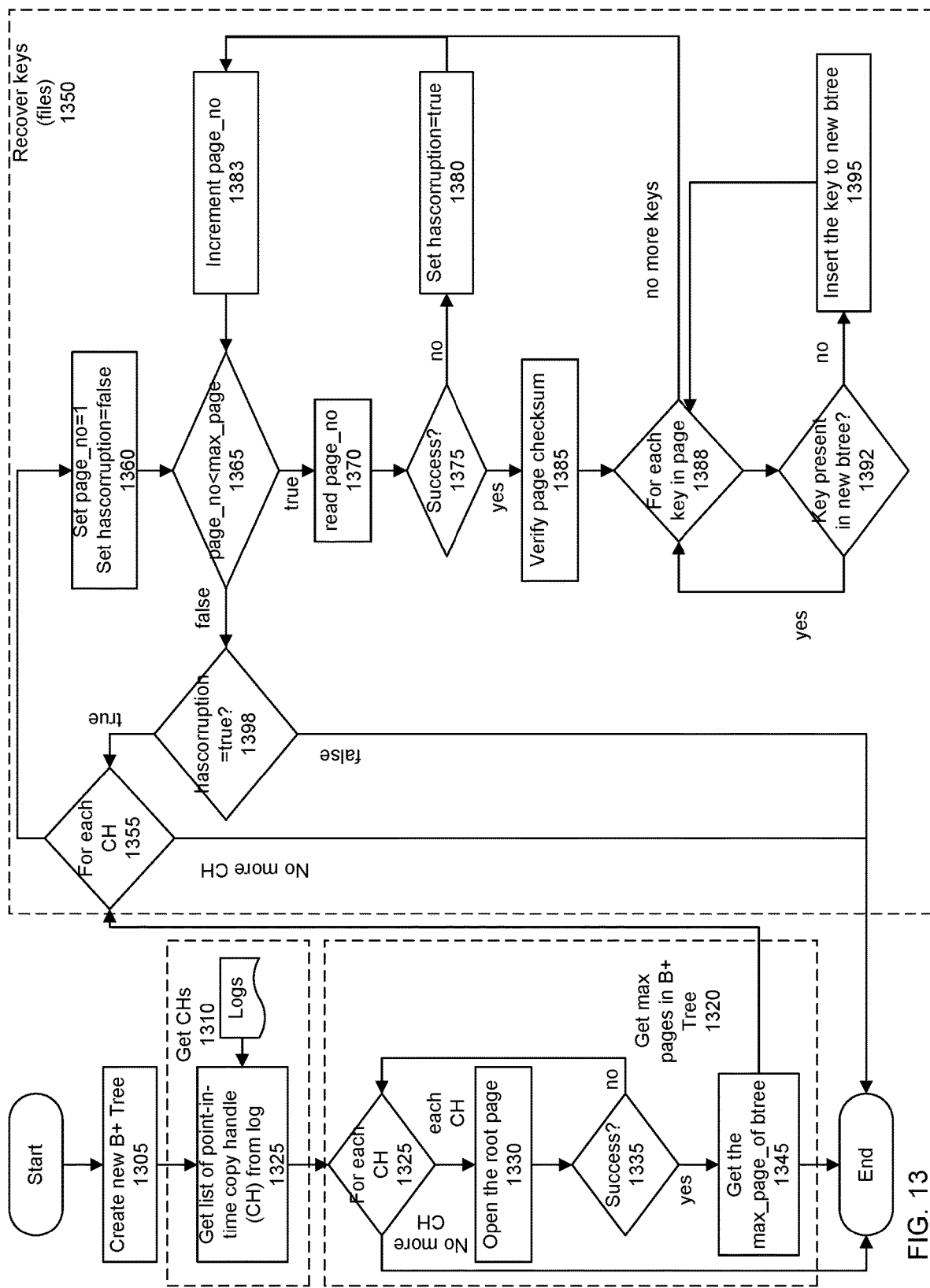
FIG. 13 shows a flow for salvaging the namespace, according to one or more embodiments.

FIG. 13 shows a flow of a key recovery process using multiple snapshots of tree. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In an embodiment, each snapshot may be identified by a content handle (CH). A step 1305 includes creating a new B+ Tree. A first stage 1310 includes getting the content handles or snapshots of the tree. In a step 1315, a list of point-in-time copy handles (e.g., snapshots) are obtained from log files maintained by the filesystem.

A second stage 1320 includes getting the maximum number of pages in a tree. More particularly, in a step 1325 for each content handle or snapshot, a root page is opened (step 1330). In a step 1335, a determination is made as to whether opening the root page was successful. If opening the root page was not successful (e.g., root page corrupted), the process moves on 1340 to a next content handle or snapshot.

If, however, opening the root page is successful, a maximum number of pages in the tree is obtained from the root page (step 1345).

The process then moves to a third stage 1350 to recover keys from the leaf pages. More particularly, in a step 1355, for each content handle or snapshot, a variable "page_number" is set to 1 and a flag "hascorruption" is set to false (step 1360).

In a step 1365, a determination is made as to whether the variable "page_number" is less than the maximum number of pages available for recovery, i.e., "max_page." If the variable "page_number" is less than the maximum number of pages available for recovery (e.g., there remain pages to be read), the process moves to reading the page identified by the "page_number" (step 1370). In a step 1375, a determination is made as to whether reading the page was successful. If reading the page was not successful, in a step 1380, the flag "hascorruption" is set to true, the "page_number" variable is incremented (step 1383), and the process loops back to determining whether there are any more remaining pages to be read.

Otherwise, if reading the page is successful, in a step 1385, the page checksum is verified. After verifying the page checksum, in a step 1388, for each key in the page, a determination is made as to whether the key is already present in the new B+ Tree (step 1392).

If the key is already present in the new B+ Tree, a next key in the page is retrieved. If, however, the key is not already present in the new B+ Tree, the key is inserted into the tree (step 1395). This process continues until there are no more keys in the page to examine.

The process then loops back to incrementing the variable "page_number" so that keys of a next page may be examined.

In a step 1398, if "page_number" is not less than "max_page" a determination is made as to whether the flag "hascorruption" has been set to true. If so, the process moves to a next content handle or snapshot as shown in the figure.

The recovered B+ Tree is the best possible collection of what is available. The directory hierarchy might be off as down-rev files could be intermixed with up-to-date ones and files deleted in the older snapshot might be visible. Users after a cyber-attack are expected to carefully review their recovered files for the correctness and will be aware of the nature of this process. This recovery procedure yields a maximal level of customer benefit from the data that is available for recovery after a cyber-attack.

Figure 14:
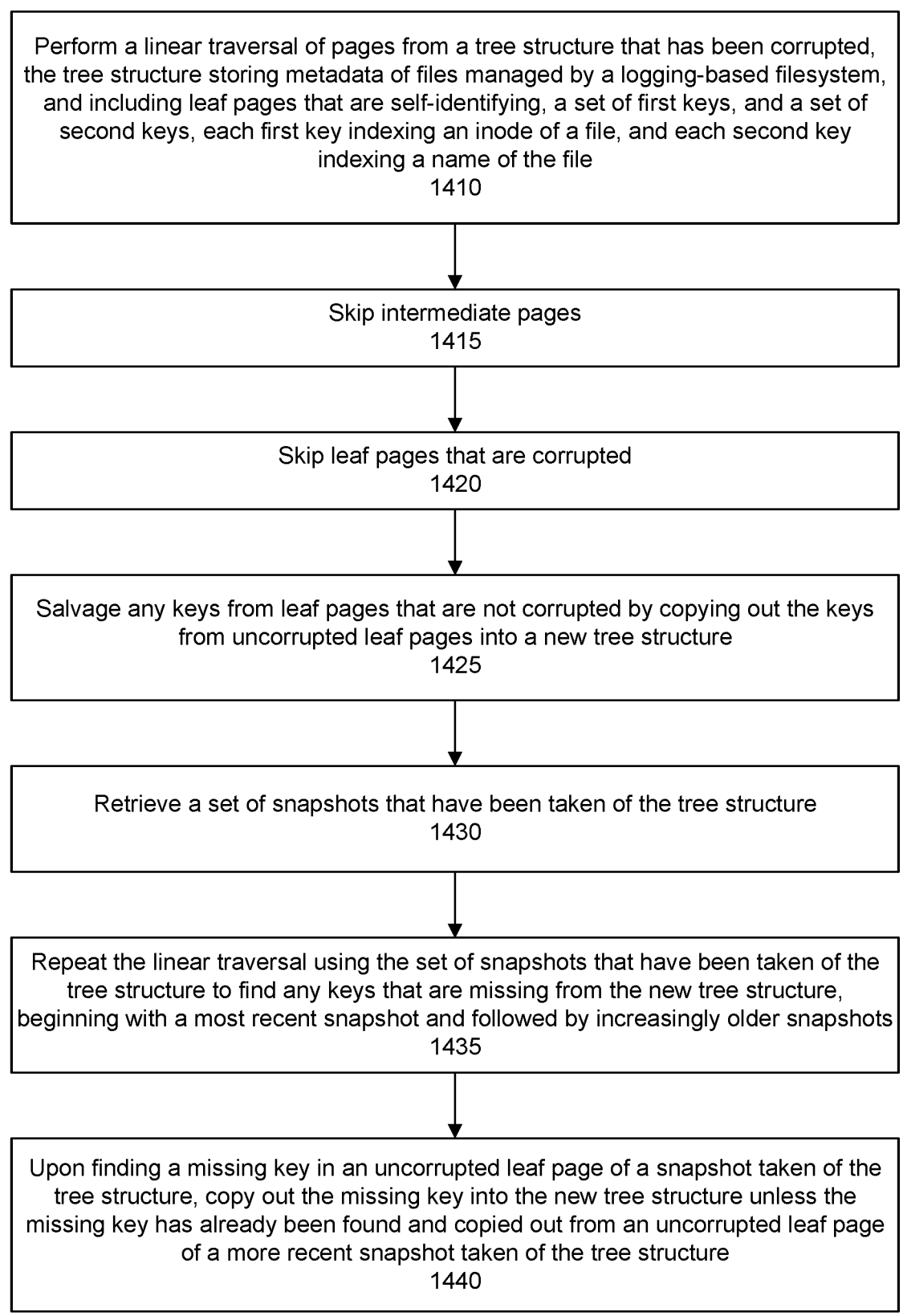
FIG. 14 shows another flow for salvaging the namespace, according to one or more embodiments.

FIG. 14 shows an overall flow for recovering a namespace stored in a tree data structure. In a step 1410, a linear traversal of pages belonging to the tree is conducted. In other words, a linear representation of the pages is scanned without regard to the hierarchical structure of the tree. In an embodiment, the tree stores metadata of files managed by a logging-based filesystem. The tree includes leaf pages that are self-identifying, a set of first keys, and a set of second keys.

Each first key indexes an inode of a file. Each second key indexes a name of the file. The linear traversal includes visiting each page belonging the tree in a sequential or linear order rather than proceeding logically or hierarchically from a top of the tree to a bottom of the tree. For example, page 0 is visited. After page 0 is visited, page 1 is visited. After page 1 is visited, page 2 is visited. After page 2 is visited, page 3 is visited. And so forth. The pages contain information about their own location within the tree structure such as its unique identifier, address, or index; information about its level or depth within the tree structure; number of child pages below the page; number of parent pages above the page; pointers to a parent, child, or both; checksum of its contents; or combinations of these.

In a step 1415, intermediate pages belonging to the tree are skipped. In a step 1420, leaf pages belonging to the tree that are corrupted are skipped. In an embodiment, detecting corruption of a leaf page may include calculating a checksum based on contents of the leaf page and comparing the calculated checksum with a checksum stored on the leaf page. A mismatch between checksums can indicate that the leaf page is corrupted. For example, the leaf page may have been altered or otherwise tampered with as part of a cyber-attack, or damaged due to disk errors or software errors.

In a step 1425, keys from leaf pages belonging to the tree that are not corrupted are salvaged by copying out the keys into leaf pages belonging a new tree structure. In an embodiment, creating the new tree structure starts with a single empty leaf page. As keys are placed into the single empty leaf page, thereby filling the page, new leaf pages are created and filled accordingly. As discussed, the keys may be sorted or placed into a sorted order. Intermediate pages can be derived from the leaf pages thereby generating a new tree structure that can be logically walked such as to fulfill requests for file lookups.

The resulting new tree structure may contain missing keys as a result of having skipped leaf pages that were found to be corrupt. Multiple attempts can then be made to find the missing keys using past snapshots that have been taken of the tree.

Thus, in a step 1430, a set of snapshots taken of the tree structure are retrieved. The snapshots may include user-generated snapshots (e.g., snapshots initiated by the user) and system-generated snapshots (e.g., snapshots initiated internally by the filesystem).

In a step 1435, the linear traversal is repeated using the set of snapshots that have been taken of the tree structure to find any keys that are missing from the new tree structure. The linear traversal is conducted by starting with a most recent snapshot and followed by increasingly older snapshots. In other words, the snapshots are examined in reverse chronological order starting with the most recent snapshot and proceeding backwards in time towards the oldest snapshot. Starting in reverse chronological order prioritizes salvaging keys indexing more recent data. Presumably, more recent or newer data is more relevant than less recent or older data. Depending on a configuration of the system, there may be many thousands of snapshots representing different states of the filesystem extending over a period of multiple weeks or more.

In a step 1440, upon finding a missing key in an uncorrupted leaf page of a snapshot taken of the tree, the missing key is copied out into the new tree structure unless the missing key has already been found and copied out from an uncorrupted leaf page of a more recent snapshot taken of the tree structure.

In an embodiment, a method to recover a tree structure that has been damaged includes: selecting a snapshot from among a set of snapshots that have been taken of the tree structure, the tree structure storing a namespace for files managed by a logging-based filesystem; scanning a linear representation of pages belonging to the snapshot of the tree structure, the pages comprising leaf pages containing keys having corresponding payloads; copying and inserting keys from an uncorrupted leaf page of the snapshot of the tree structure into a new tree structure unless the keys have already been copied and inserted into the new tree structure from an uncorrupted leaf page of a more recent snapshot; and repeating the selecting, scanning, and copying and inserting for each snapshot of the plurality of snapshots. In an embodiment, the selection of a snapshot is made in reverse chronological order. In other embodiments, equivalent results may be achieved by making the snapshot selection in chronological order and replacing keys copied from a snapshot into the new tree structure with keys from a more recent snapshot taken of the tree structure.

The result of the process shown in FIG. 14, including iterating or passing through multiple snapshots of previous versions of the tree to find missing keys, is a new tree data structure holding the filesystem namespace. As a result, the new tree data structure can be used, examined, or reviewed to place files in their original locations or directories rather than merely listing files in a single directory. Placing the files in their original locations helps to provide the user with semantics and context that more closely resembles the original filesystem. For example, even if a name of a file could not be recovered, the file may be placed in a directory within which it was originally located. This placement can help provide the user with a clue as to the file name. In an embodiment, a method includes reviewing the new tree structure to identify a directory within which a particular file resided at a previous point-in-time and placing the particular file in the identified directory.

The new tree data structure may have been reconstructed by taking bits and pieces from different versions of the tree. More particularly, the new tree may include a mix of new and old keys including keys pointing to most recent versions of file metadata, keys pointing to older versions of file metadata (such as when keys pointing to newer versions of file metadata could not be salvaged), and missing keys (such as when no keys could be salvaged). In other words, when a most recent version of information cannot be recovered, attempts are made to recover earlier versions of the information.

For example, as discussed, a file is associated with multiple keys. A first key may be referred to as a CHILD key which references an inode of the file. A second key may be referred to as a DIRENT key which references a name of the file. In some cases, the first key may reference a most recent version of the inode and the second key may reference a most recent version of the file name. Such cases may be considered a full recovery. In other cases, however, the first key, second key, or both may reference older versions. Such cases may be referred to as partial recoveries. As another example, one or both keys may not have been recovered at all. Such cases may be referred to as no recovery.

For example, the first key may reference an earlier version of the inode which, in turn, may not necessarily contain the most recent file metadata including most recent file pointers. As a result, the content of the file may be an older version of the content. Nonetheless, if a newer version of the content could not be recovered, a user is likely to appreciate being able to recover at least the older version. As another example, the second key may reference an earlier version of the file name. For example, a file may have been renamed from "foo" to "fuh." The key to the most recent file name "fuh" may not be salvageable, but the key to the previous file name "foo" may have been salvageable. In this case, the file is assigned the prior file name "foo."

Figures 15, 16:
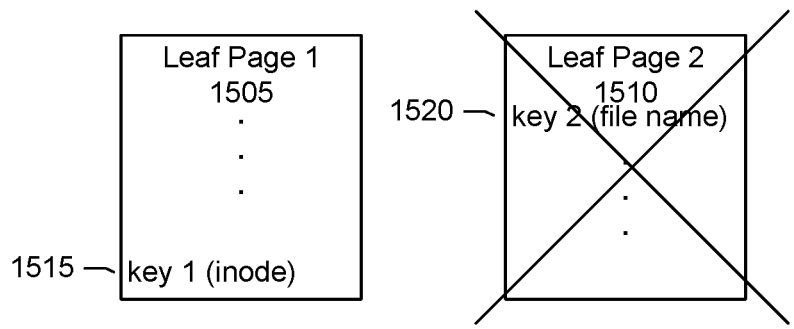
FIG. 15 shows a block diagram of keys for a file being split across leaf pages where one of the keys could not be salvaged, according to one or more embodiments.
FIG. 16 shows a flow for handling a scenario shown in FIG. 15, according to one or more embodiments.

In some cases, a key for a particular file may have been salvaged, but another key for the particular file may not have been salvaged. For example, FIG. 15 shows an example of a scenario where keys of a file are split across two leaf pages and one of the leaf pages was determined to be corrupt thereby preventing all keys in the page from being salvageable. There is a first leaf page 1505 and a second leaf page 1510, ordered sequentially after the first leaf page. The first leaf page includes a set of keys including a first key 1515. The second leaf page includes another set of keys including a second key 1520. The first key points to an inode of a particular file and the second key points to a file name of the particular file. An "X" superimposed over the second leaf page indicates that the page is corrupt and thus no keys have been salvaged from the page.

FIG. 16 shows a flow for handling the scenario shown in FIG. 15. In a step 1610, when a first key indexing an inode of a particular file has been found, but a second key indexing a name of the particular file has not been found, a new name is generated for the particular file. In an embodiment, the new name includes an inode number of the particular file and a placeholder name. The inode number can be fetched from the inode of the particular file. The placeholder name is a system-generated name since the actual name of the file could not be found.

In a step 1615, the new name is assigned to the particular file. For example, the file may be assigned the name "recovered_file_12", where "recovered_file" is the system-generated name for the file and "12" is the inode number of the file.

The particular file having the newly assigned name may be placed in a global lost and found directory. Instead or additionally, the particular file, as discussed, may be placed in a directory according to the new tree structure. In other words, rather than collecting recovered files into a single global directory, the files are placed into the directories within which they resided according to the new tree structure. The particular file having the new name is placed in a directory according to the new tree structure, the particular file thereby having resided in the directory at a previous point-in-time.

Consider, as an example, that a file named "Q4 budget" that originally resided in a folder named "financials" was impacted by a cyber-attack. An attempt to recover the namespace resulted in a recovery of a key indexing an inode of the file, but recovery of a key indexing a name of the file could not be salvaged. In this case, the file may be renamed as "recovered_file_12" (with "12" being the inode number). The recovered namespace can then be used to place the file, i.e., "recovered_file_12" in the folder "financials." While the file name itself was not recovered, the placing of the file back in its original location helps to provide the user with some context as to the name of the file.

Figures 17, 18:
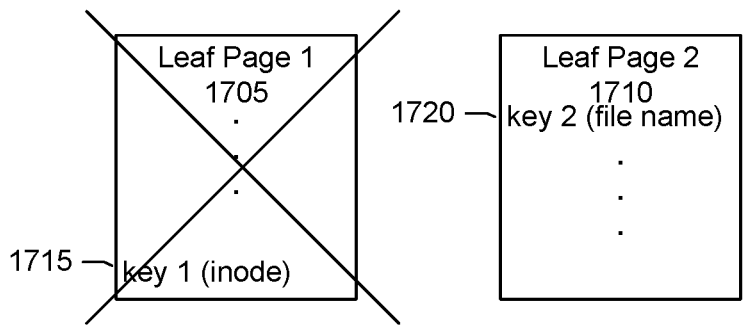
FIG. 17 shows another block diagram of keys for a file being split across leaf pages where one of the keys could not be salvaged, according to one or more embodiments.
FIG. 18 shows a flow for handling a scenario shown in FIG. 17, according to one or more embodiments.

FIG. 17 shows another example of a scenario where keys of a file are split across two leaf pages and one of the leaf pages was determined to be corrupt thereby preventing all keys in the page from being salvageable. The example shown in FIG. 17 is similar to the example shown in FIG. 15. For example, there is a first leaf page 1705 and a second leaf page 1710, ordered sequentially after the first leaf page. The first leaf page includes a set of keys including a first key 1715. The second leaf page includes another set of keys including a second key 1720. The first key points to an inode of a particular file and the second key points to a file name of the particular file. In this example, however, an "X" is superimposed over the first leaf page to indicate that the page is corrupt and thus no keys have been salvaged from the page.

FIG. 18 shows a flow for handling the scenario shown in FIG. 17. In a step 1810, when a first key indexing an inode of a particular file has not been found, but a second key indexing a name of particular file has been found, a new name is generated for the particular file. In an embodiment, the new name includes the name of the particular file and an indication that file contents have been lost.

In a step 1815, the new name is assigned to the particular file. For example, the file may be assigned the name "lost_foo," where "lost" is a system-generated term indicating that the file contents could not be recovered and "foo" is the user-generated name for the file that was recovered.

Making multiple passes over a set of historical or past snapshots of the tree structure facilitates finding a complete set of keys for the files. While some keys may not reference the most up-to-date values and may instead reference older or earlier values that were subsequently changed, it is likely that a user will appreciate having an older version as compared to having nothing at all. For example, being able to see a file having a name that is old or that has been changed is more desirable than not being able to see the name at all. Being able to access contents of a file that are old or that have been changed is more desirable than not being able to access the contents at all.

As discussed, in an embodiment, leaf pages that are determined to be corrupt are skipped. That is, keys from a corrupted leaf page are not harvested. In another embodiment, however, individual keys that are not themselves corrupt are harvested from a corrupted leaf page. Keys themselves are self-identifying thereby allowing for a determination of whether or not a particular key is corrupt. For example, each key includes a checksum which is based on contents of a key. Detecting whether a key is corrupt may include calculating a checksum of its contents and comparing the calculated checksum to the checksum contained within the key. A mismatch between checksums indicates that the key is corrupt. A match between checksums indicates that the key is not corrupt.

In an embodiment, a method includes: scanning a linear representation of pages belonging to a tree structure that has been corrupted, the tree structure storing metadata of files managed by a logging-based filesystem, and comprising leaf pages having keys indexing the metadata; during the scanning, salvaging keys from leaf pages that are not corrupted by copying out the keys from uncorrupted leaf pages into a new tree structure; retrieving a plurality of snapshots that have been taken of the tree structure; repeating the scanning using the plurality of snapshots that have been taken of the tree structure to find keys that are missing from the new tree structure; and upon finding a missing key in an uncorrupted leaf page of a snapshot taken of the tree structure, copying out the missing key into the new tree structure unless the missing key has already been found and copied out from an uncorrupted leaf page of a more recent snapshot taken of the tree structure.

The new tree structure may include keys indexing most recent versions of the metadata and keys indexing older versions of the metadata, the keys indexing older versions of the metadata including keys salvaged from different snapshots taken of the tree structure at different points-in-time.

Repeating the scanning using the plurality of snapshots that have been taken of the tree structure may include selecting the snapshots in reverse chronological order.

In an embodiment, the tree structure comprises intermediate pages referencing the leaf pages and the scanning the linear representation comprises: skipping the intermediate pages; and skipping leaf pages that are corrupt.

In an embodiment, the keys comprise a plurality of first keys and a plurality of second keys, each first key indexes an inode of a file, and each second key indexes a name of the file, and the method further comprises: when a first key indexing an inode of a particular file has been found, but a second key indexing a name of the particular file has not been found, generating a new name for the particular file that includes an inode number of the particular file, and a placeholder name; and assigning the new name to the particular file.

In an embodiment, the method includes reviewing the new tree structure to identify a directory within which the particular file resided at a previous point-in-time; and placing the particular file having the new name in the identified directory.

In another embodiment, there is a system comprising: a processor; and memory configured to store one or more sequences of instructions which, when executed by the processor, cause the processor to carry out the steps of: scanning a linear representation of pages belonging to a tree structure that has been corrupted, the tree structure storing metadata of files managed by a logging-based filesystem, and comprising leaf pages having keys indexing the metadata; during the scanning, salvaging keys from leaf pages that are not corrupted by copying out the keys from uncorrupted leaf pages into a new tree structure; retrieving a plurality of snapshots that have been taken of the tree structure; repeating the scanning using the plurality of snapshots that have been taken of the tree structure to find keys that are missing from the new tree structure; and upon finding a missing key in an uncorrupted leaf page of a snapshot taken of the tree structure, copying out the missing key into the new tree structure unless the missing key has already been found and copied out from an uncorrupted leaf page of a more recent snapshot taken of the tree structure.

In another embodiment, there is a computer program product, comprising a non-transitory computer-readable medium having a computer-readable program code embodied therein, the computer-readable program code adapted to be executed by one or more processors to implement a method comprising: scanning a linear representation of pages belonging to a tree structure that has been corrupted, the tree structure storing metadata of files managed by a logging-based filesystem, and comprising leaf pages having keys indexing the metadata; during the scanning, salvaging keys from leaf pages that are not corrupted by copying out the keys from uncorrupted leaf pages into a new tree structure; retrieving a plurality of snapshots that have been taken of the tree structure; repeating the scanning using the plurality of snapshots that have been taken of the tree structure to find keys that are missing from the new tree structure; and upon finding a missing key in an uncorrupted leaf page of a snapshot taken of the tree structure, copying out the missing key into the new tree structure unless the missing key has already been found and copied out from an uncorrupted leaf page of a more recent snapshot taken of the tree structure.

In another embodiment, there is a method comprising: performing a linear traversal of pages from a tree structure, that has been corrupted, without regard to a hierarchy of the tree structure, the tree structure storing metadata of files managed by a filesystem, and comprising leaf pages that are self-identifying, a plurality of first keys, and a plurality of second keys, each first key indexes an inode of a file, and each second key indexes a name of the file; during the linear traversal, salvaging any keys from leaf pages that are not corrupted by copying out the keys from uncorrupted leaf pages into a new tree structure; retrieving a plurality of snapshots that have been taken of the tree structure, the plurality of snapshots comprising snapshots initiated by a user of the filesystem, and snapshots initiated internally by the filesystem; repeating the linear traversal using the plurality of snapshots that have been taken of the tree structure to find any keys that are missing from the new tree structure beginning with a most recent snapshot and followed by increasingly older snapshots; upon finding a missing key in an uncorrupted leaf page of a snapshot taken of the tree structure, copying out the missing key into the new tree structure unless the missing key has already been found and copied out from an uncorrupted leaf page of a more recent snapshot taken of the tree structure; when a first key indexing an inode of a particular file has been found, but a second key indexing a particular name of the particular file has not been found, generating a new name for the particular file that includes an inode number of the particular file and a placeholder name; when the first key indexing the inode of the particular file has not been found, but the second key indexing the particular name of the particular file has been found, generating a new name for the particular file that includes the particular name and an indication that the particular file could not be recovered; and placing the particular file having the new name in a directory where the particular file was found based on the new tree structure.

In an embodiment, systems and techniques for recovering a namespace are applied to filesystems that are logging-based. A logging-based filesystem may be a deduplicating filesystem. This is not necessarily always the case, however, and the described principles and aspects for recovering a namespace can be applied to logging-based filesystems that are not deduplicating.

Referring back now to FIG. 1, the clients may include servers, desktop computers, laptops, tablets, smartphones, internet of things (IoT) devices, or combinations of these. The data protection backup storage system receives requests from the clients, performs processing required to satisfy the requests, and forwards the results corresponding to the requests back to the requesting client system. The processing required to satisfy the request may be performed by the data protection storage appliance or may alternatively be delegated to other servers connected to the network.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system connected to the data protection server may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

Figure 19:
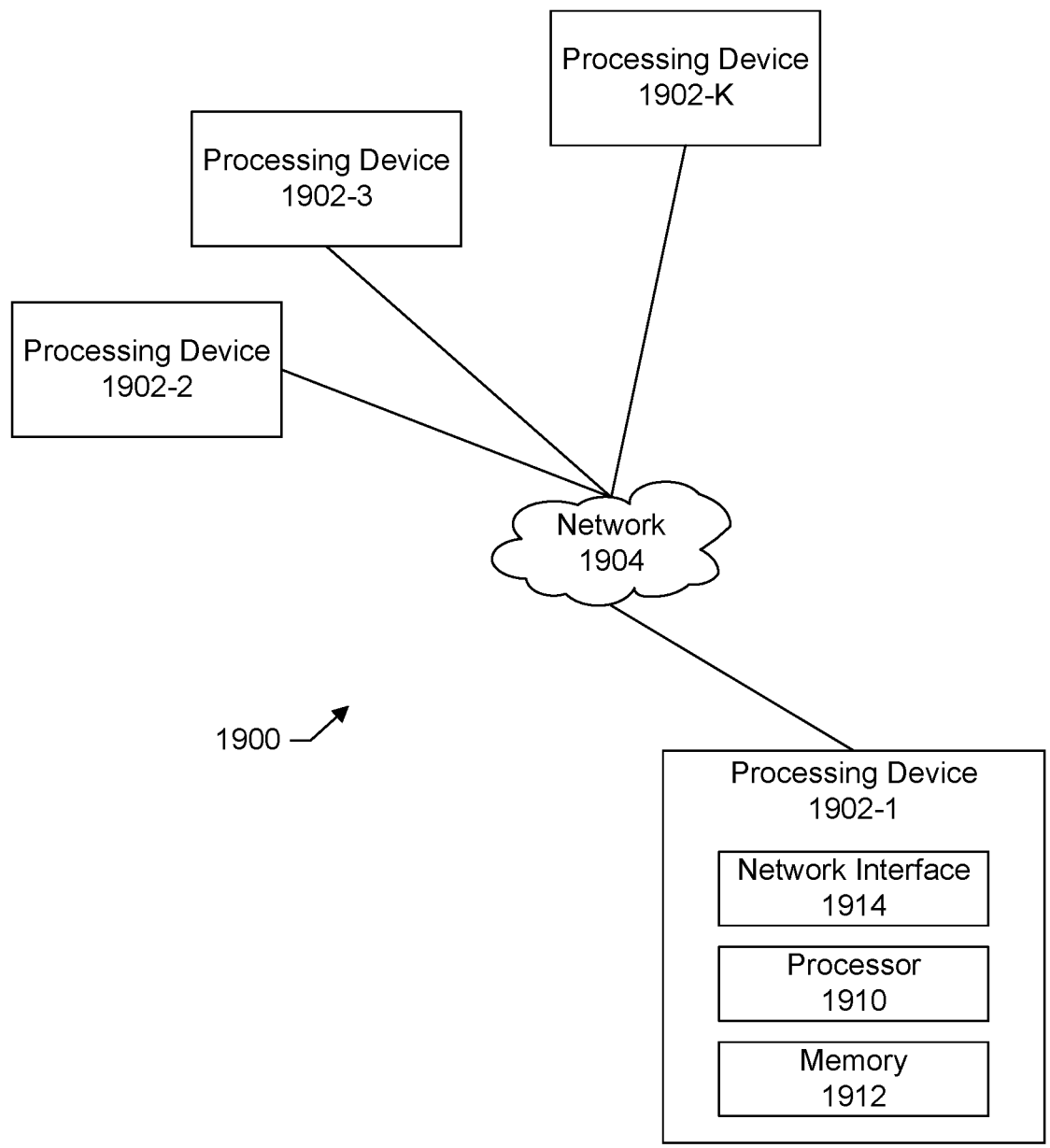
FIG. 19 shows a block diagram of a processing platform that may be utilized to implement at least a portion of an information processing system, according to one or more embodiments.

FIG. 19 shows an example of a processing platform 1900 that may include at least a portion of the information handling system shown in FIG. 1. The example shown in FIG. 19 includes a plurality of processing devices, denoted 1902-1, 1902-2, 1902-3, . . . 1902-K, which communicate with one another over a network 1904.

The network 1904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1902-1 in the processing platform 1900 comprises a processor 1910 coupled to a memory 1912.

The processor 1910 may comprise a microprocessor, a microcontroller, an application-specific integrated circuit (ASIC), a field-programmable gate array (FPGA) or other type of processing circuitry, as well as portions or combinations of such circuitry elements.

The memory 1912 may comprise random access memory (RAM), read-only memory (ROM) or other types of memory, in any combination. The memory 1912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1902-1 is network interface circuitry 1914, which is used to interface the processing device with the network 1904 and other system components, and may comprise conventional transceivers.

The other processing devices 1902 of the processing platform 1900 are assumed to be configured in a manner similar to that shown for processing device 1902-1 in the figure.

Again, the particular processing platform 1900 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 20:
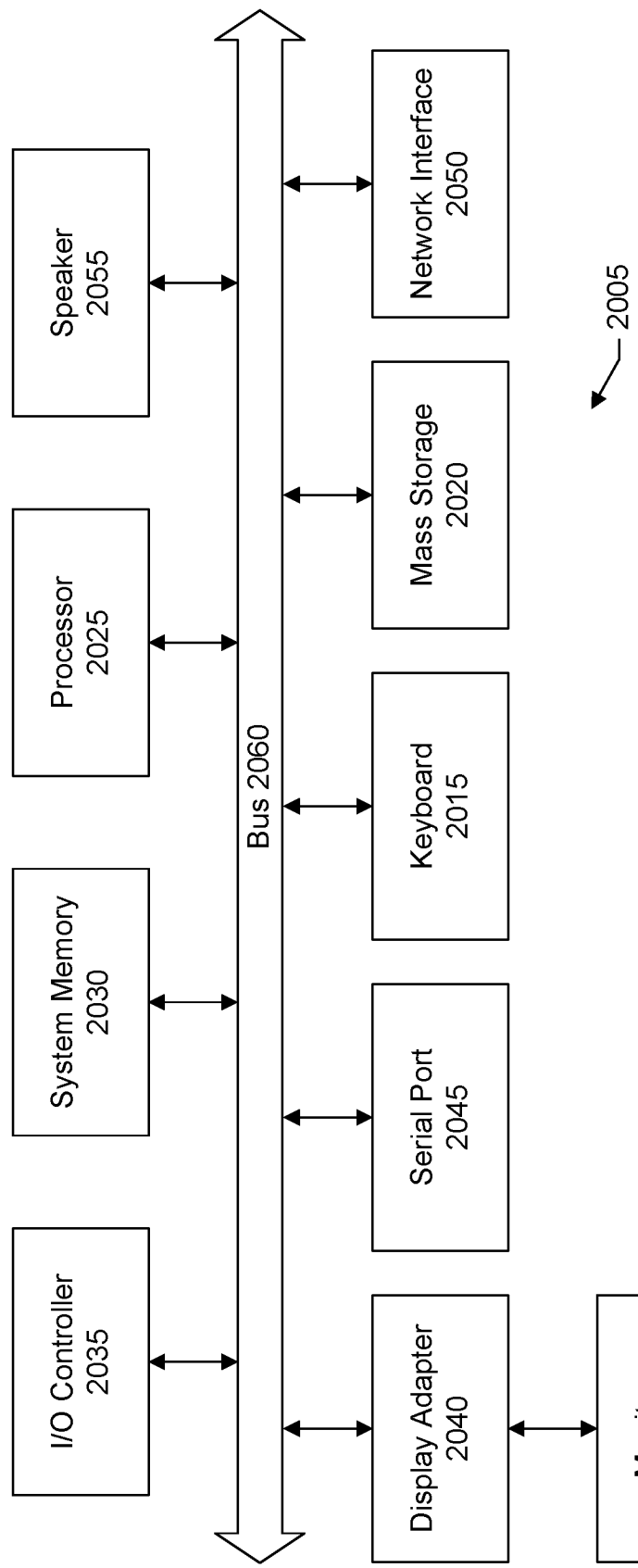
FIG. 20 shows a block diagram of a computer system suitable for use with the system, according to one or more embodiments.

FIG. 20 shows a system block diagram of a computer system 2005 used to execute the software of the present system described herein. The computer system includes a monitor 2007, keyboard 2015, and mass storage devices 2020. Computer system 2005 further includes subsystems such as central processor 2025, system memory 2030, input/output (I/O) controller 2035, display adapter 2040, serial or universal serial bus (USB) port 2045, network interface 2050, and speaker 2055. The system may also be used with computer systems with additional or fewer subsystems. For example, a computer system could include more than one processor 2025 (i.e., a multiprocessor system) or a system may include a cache memory.

Arrows such as 2060 represent the system bus architecture of computer system 2005. However, these arrows are illustrative of any interconnection scheme serving to link the subsystems. For example, speaker 2055 could be connected to the other subsystems through a port or have an internal direct connection to central processor 2025. The processor may include multiple processors or a multicore processor, which may permit parallel processing of information. Computer system 2005 shown in FIG. 20 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11c, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

scanning a linear representation of pages belonging to a tree structure that has been corrupted, the tree structure storing metadata of files managed by a logging-based filesystem, and comprising leaf pages having keys indexing the metadata;

during the scanning, salvaging keys from leaf pages that are not corrupted by copying out the keys from uncorrupted leaf pages into a new tree structure;

retrieving a plurality of snapshots that have been taken of the tree structure;

repeating the scanning using the plurality of snapshots that have been taken of the tree structure to find keys that are missing from the new tree structure;

upon finding a missing key in an uncorrupted leaf page of a snapshot taken of the tree structure, copying out the missing key into the new tree structure unless the missing key has already been found and copied out from an uncorrupted leaf page of a more recent snapshot taken of the tree structure;

wherein the keys comprise a plurality of first keys and a plurality of second keys, each first key indexes an inode of a file, and each second key indexes a name of the file, and the method further comprises: when a first key indexing an inode of a particular file has been found, but a second key indexing a name of the particular file has not been found, generating a new name for the particular file that includes an inode number of the particular file, and a placeholder name;

assigning the new name to the particular file;

reviewing the new tree structure to identify a directory within which the particular file resided at a previous point-in-time; and placing the particular file having the new name in the identified directory.

2. The method of claim 1 wherein the new tree structure comprises keys indexing most recent versions of the metadata and keys indexing older versions of the metadata, the keys indexing older versions of the metadata including keys salvaged from different snapshots taken of the tree structure at different points-in-time.

3. The method of claim 1 wherein the repeating the scanning using the plurality of snapshots that have been taken of the tree structure comprises selecting the snapshots in reverse chronological order.

4. The method of claim 1 wherein the tree structure comprises intermediate pages referencing the leaf pages and the scanning the linear representation comprises:

skipping the intermediate pages; and skipping leaf pages that are corrupt.

5. A system comprising: a processor; and memory configured to store one or more sequences of instructions which, when executed by the processor, cause the processor to carry out the steps of:

scanning a linear representation of pages belonging to a tree structure that has been corrupted, the tree structure storing metadata of files managed by a logging-based filesystem, and comprising leaf pages having keys indexing the metadata;

during the scanning, salvaging keys from leaf pages that are not corrupted by copying out the keys from uncorrupted leaf pages into a new tree structure;

retrieving a plurality of snapshots that have been taken of the tree structure;

repeating the scanning using the plurality of snapshots that have been taken of the tree structure to find keys that are missing from the new tree structure;

upon finding a missing key in an uncorrupted leaf page of a snapshot taken of the tree structure, copying out the missing key into the new tree structure unless the missing key has already been found and copied out from an uncorrupted leaf page of a more recent snapshot taken of the tree structure;

wherein the keys comprise a plurality of first keys and a plurality of second keys, each first key indexes an inode of a file, and each second key indexes a name of the file, and the processor further carries out the steps of:

when a first key indexing an inode of a particular file has been found, but a second key indexing a name of the particular file has not been found, generating a new name for the particular file that includes an inode number of the particular file, and a placeholder name;

assigning the new name to the particular file;

reviewing the new tree structure to identify a directory within which the particular file resided at a previous point-in-time; and placing the particular file having the new name in the identified directory.

6. The system of claim 5 wherein the new tree structure comprises keys indexing most recent versions of the metadata and keys indexing older versions of the metadata, the keys indexing older versions of the metadata including keys salvaged from different snapshots taken of the tree structure at different points-in-time.

7. The system of claim 5 wherein the repeating the scanning using the plurality of snapshots that have been taken of the tree structure comprises selecting the snapshots in reverse chronological order.

8. The system of claim 5 wherein the tree structure comprises intermediate pages referencing the leaf pages and the scanning the linear representation comprises:

skipping the intermediate pages; and skipping leaf pages that are corrupt.

9. A computer program product, comprising a non-transitory computer-readable medium having a computer-readable program code embodied therein, the computer-readable program code adapted to be executed by one or more processors to implement a method comprising:

scanning a linear representation of pages belonging to a tree structure that has been corrupted, the tree structure storing metadata of files managed by a logging-based filesystem, and comprising leaf pages having keys indexing the metadata;

during the scanning, salvaging keys from leaf pages that are not corrupted by copying out the keys from uncorrupted leaf pages into a new tree structure;

retrieving a plurality of snapshots that have been taken of the tree structure;

repeating the scanning using the plurality of snapshots that have been taken of the tree structure to find keys that are missing from the new tree structure;

upon finding a missing key in an uncorrupted leaf page of a snapshot taken of the tree structure, copying out the missing key into the new tree structure unless the missing key has already been found and copied out from an uncorrupted leaf page of a more recent snapshot taken of the tree structure;

wherein the keys comprise a plurality of first keys and a plurality of second keys, each first key indexes an inode of a file, and each second key indexes a name of the file, and the method further comprises:

when a first key indexing an inode of a particular file has been found, but a second key indexing a name of the particular file has not been found, generating a new name for the particular file that includes an inode number of the particular file, and a placeholder name;

assigning the new name to the particular file;

reviewing the new tree structure to identify a directory within which the particular file resided at a previous point-in-time; and placing the particular file having the new name in the identified directory.

10. The computer program product of claim 9 wherein the new tree structure comprises keys indexing most recent versions of the metadata and keys indexing older versions of the metadata, the keys indexing older versions of the metadata including keys salvaged from different snapshots taken of the tree structure at different points-in-time.

11. The computer program product of claim 9 wherein the repeating the scanning using the plurality of snapshots that have been taken of the tree structure comprises selecting the snapshots in reverse chronological order.

12. The computer program product of claim 9 wherein the tree structure comprises intermediate pages referencing the leaf pages and the scanning the linear representation comprises:

skipping the intermediate pages; and skipping leaf pages that are corrupt.

* * * * *